United States Patent
Matsubara et al.

(10) Patent No.: US 7,453,349 B2
(45) Date of Patent: Nov. 18, 2008

(54) VEHICULAR ALARM APPARATUS AND REMOTE CONTROL APPARATUS THEREFOR

(75) Inventors: Manabu Matsubara, Hyogo (JP); Minoru Yoshimura, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 169 days.

(21) Appl. No.: 11/060,694

(22) Filed: Feb. 18, 2005

(65) Prior Publication Data

US 2005/0179525 A1  Aug. 18, 2005

(30) Foreign Application Priority Data

Feb. 18, 2004 (JP) ............... 2004-041274

(51) Int. Cl. *B60R 25/10* (2006.01)
(52) U.S. Cl. ............... 340/426.13; 340/425.5; 340/426.22; 307/10.2
(58) Field of Classification Search ............ 340/426.13, 340/426.22, 425.5, 426.28, 426.34, 438; 307/10.2
See application file for complete search history.

(56) References Cited

U.S. PATENT DOCUMENTS

| | | | | |
|---|---|---|---|---|
| 4,796,002 A | * | 1/1989 | Heidman, Jr. ............... 340/428 |
| 5,568,120 A | * | 10/1996 | LeMense et al. ........ 340/426.28 |
| 6,049,268 A | * | 4/2000 | Flick ........................ 340/425.5 |
| 6,130,605 A | * | 10/2000 | Flick ...................... 340/426.23 |
| 6,184,780 B1 | * | 2/2001 | Allen et al. .............. 340/426.3 |
| 6,285,296 B1 | * | 9/2001 | Christie ................. 340/825.69 |
| 6,452,484 B1 | * | 9/2002 | Drori .................... 340/426.13 |

FOREIGN PATENT DOCUMENTS

| | | |
|---|---|---|
| JP | 07-71338 | 3/1995 |
| JP | 10-222782 | 8/1998 |
| JP | 11-120461 | 4/1999 |
| JP | 2002-138724 | 5/2002 |
| JP | 2003-63355 | 3/2003 |

* cited by examiner

*Primary Examiner*—Davetta W. Goins
(74) *Attorney, Agent, or Firm*—Oliff & Berridge, PLC

(57) ABSTRACT

A remote control apparatus controls operation of a vehicular alarm apparatus. The remote control apparatus has a transmission section that transmits to the vehicular alarm apparatus (a) a first alarm instruction for causing the vehicular alarm apparatus to perform a first alarm operation and (b) a second alarm instruction for causing the vehicular alarm apparatus to perform a second alarm operation, which is different from the first alarm operation.

14 Claims, 20 Drawing Sheets

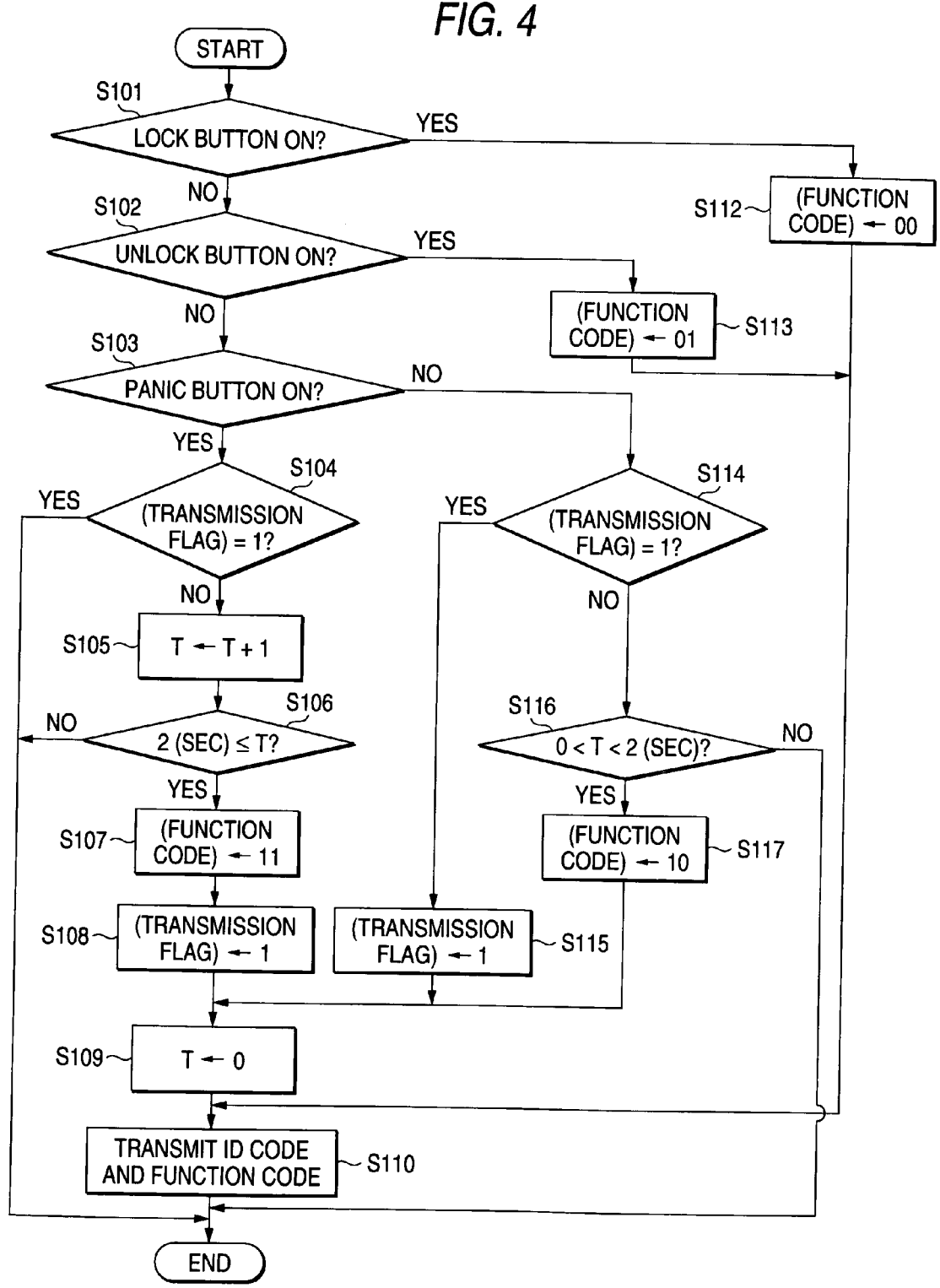

VEHICULAR ALARM APPARATUS AND REMOTE CONTROL APPARATUS THEREFOR

BACKGROUND OF THE INVENTION

1. Field of the Invention

The present invention relates to a vehicular alarm apparatus that outputs an alarm when detecting an abnormality in a vehicle and to a remote control apparatus therefor. In particular, the invention relates to a vehicular alarm apparatus that provides both of an effect of repelling a suspicious person and an effect of reducing noise pollution and to a remote control apparatus for such a vehicular alarm apparatus.

2. Description of the Related Art

A vehicular alarm apparatus that issue an alarm when detecting, for example, a theft from a vehicle and a wireless door lock apparatus that allows remote control of the locking and unlocking of the doors of a vehicle have been used. Further, in recent years, a vehicular alarm apparatus and a wireless door lock apparatus having a panic alarm function of forcing the apparatus to perform an alarm operation in response to a remote manipulation have been put into practical use.

The panic alarm function, which is used when, for example, a driver has found a suspicious person who is walking around a vehicle or damaging a vehicle, can repel such a person safely by a remote manipulation of an alarm without approaching the suspicious person.

For example, JP-B-Hei. 7-71338 discloses a technique for realizing panic alarming with a simple manipulation by issuing an alarm when communication data as an instruction to lock or unlock doors has been received continuously for a predetermined time or longer in a receiving apparatus used in a keyless entry system.

SUMMARY OF THE INVENTION

Incidentally, the same alarm as used at the time of detection of a theft, such as a vehicle horn sound, is used conventionally as an alarm of the panic alarm function. Since this alarm is very loud, it has a problem of causing noise pollution (annoyance to the neighborhood) though it provides the effect of repelling a suspicious person.

In recent years, it has therefore been an important subject to realize a panic alarm function capable of repelling a suspicious person while reducing noise pollution.

The present invention has been made to solve the above problem and attain the above subject. Therefore, the invention provides a vehicular alarm apparatus having both of an effect of repelling a suspicious person and an effect of reducing noise pollution as well as a remote control apparatus for such a vehicular alarm apparatus.

According to one embodiment of the invention, a remote control apparatus controls operation of a vehicular alarm apparatus. The remote control apparatus has a transmission section that transmits to the vehicular alarm apparatus (a) a first alarm instruction for causing the vehicular alarm apparatus to perform a first alarm operation and (b) a second alarm instruction for causing the vehicular alarm apparatus to perform a second alarm operation, which is different from the first alarm operation.

With this configuration, the remote control apparatus reduces noise pollution by selecting an alarm operation suitable for a current situation from plural alarm operations, while the remote control apparatus can repel a suspicious person.

The remote control apparatus may further has a common manipulation section that is used both in transmitting the first alarm instruction and in transmitting the second alarm instruction. The transmission section determines which of the first alarm instruction and the second alarm instruction should be transmitted depending on how the common manipulation section is manipulated.

According to this modification, the remote control apparatus can repel a suspicious person while reducing noise pollution by selecting an alarm operation suitable for a current situation from the plural alarm operations, though the remote control apparatus is simple in configuration and merely requires simple manipulations.

The common manipulation section may be used in making a manipulation for transmitting at least one of a vehicle door lock instruction, a vehicle door unlock instruction, a monitoring start instruction, and a monitoring end instruction.

According to this modification, the remote control apparatus can repel a suspicious person while reducing noise pollution by selecting an alarm operation suitable for a current situation from the plural alarm operations, though the remote control apparatus is simple in configuration and merely requires simple manipulations.

The transmission section may store a first output condition corresponding to the first alarm instruction and a second output condition corresponding to the second alarm instruction. The transmission section transmits the first alarm instruction at a time point when the first output condition is satisfied. The transmission section switches the first alarm instruction to the second alarm instruction when the second output condition is satisfied after the satisfaction of the first output condition.

According to this modification, the remote control apparatus can repel a suspicious person quickly by issuing an alarm at the start of a manipulation while reducing noise pollution.

The first alarm operation may be less loud than the second alarm operation

According to this modification, the remote control apparatus provides noise pollution reducing effect.

According to one embodiment of the invention, a vehicular alarm apparatus detects an abnormality in a vehicle and outputs an alarm. The vehicular alarm apparatus has a reception section and an alarm section. The reception section receives an alarm instruction, which is a forcible alarm output instruction. The alarm section selects one of a first alarm operation and a second alarm operation, which is different from the first alarm operation, when an abnormality is detected in the vehicle or the reception section receives the alarm instruction. Then, the alarm section performs the selected one of the first alarm operation and the second alarm operation.

With this configuration, the remote control apparatus can repel a suspicious person while reducing noise pollution by selecting an alarm operation suitable for a current situation from plural alarm operations.

The reception section may receive a first alarm instruction to perform the first alarm operation and a second alarm instruction to perform the second alarm operation.

With this modification, the remote control apparatus can repel a suspicious person while reducing noise pollution by selecting a designated alarm operation from the plural alarm operations.

The alarm section may select the one of the first alarm operation and the second alarm operation on a basis of how the reception section receives the alarm instruction.

According to this modification, the remote control apparatus can repel a suspicious person while reducing noise pollution by selecting an alarm operation suitable for a current situation from the plural alarm operations.

The first alarm operation may be less loud than the second alarm operation

According to this modification, the remote control apparatus provides a noise pollution reducing effect.

The alarm section may select the second alarm operation when an abnormality is detected in the vehicle.

According to this modification, in the remote control apparatus, the same operation detail is shared by the independent alarm operation and the forcible alarm operation.

The vehicular alarm apparatus may further has a program section that changes an operation detail of at least one of the first alarm operation and the second alarm operation.

According to this modification, the remote control apparatus can repel a suspicious person while reducing noise pollution by using alarm operations that can be changed arbitrarily.

According to one embodiment of the invention, a vehicular alarm apparatus detects an abnormality in a vehicle and outputs an alarm. The vehicular alarm apparatus has the reception section, the first alarm section, and the second alarm section. The reception section receives an alarm instruction, which is a forcible alarm output instruction. The first alarm section performs a first alarm operation when the reception section receives the alarm instruction. The second alarm section performs a second alarm operation, which is different from the first alarm operation, when an abnormality in the vehicle is detected.

With this configuration, the vehicular alarm apparatus can repel a suspicious person while reducing noise pollution by selecting an alarm operation suitable for a current situation from plural alarm operations.

According to one embodiment of the invention, a vehicular alarm apparatus has a theft detection section, a reception section, and an operation selecting section. The theft detection section detects a theft in response to an output from a sensor mounted on a vehicle. The reception section receives an instruction from a transmitter. The operation selecting section selects one of a first alarm operation and a second alarm operation in response to the received instruction. The operation selecting section selects and performs the second alarm operation in response to a detection output of the theft detection section.

BRIEF DESCRIPTION OF THE DRAWINGS

FIG. 4 is a flowchart showing a process that is executed by a code generation section shown in FIG. 1.

DETAILED DESCRIPTION OF THE PREFERRED EMBODIMENTS

A vehicular alarm apparatus and a remote control apparatus according to embodiments of the invention will be hereinafter described in detail with reference to the accompanying drawings.

Embodiment 1

Figure 1:
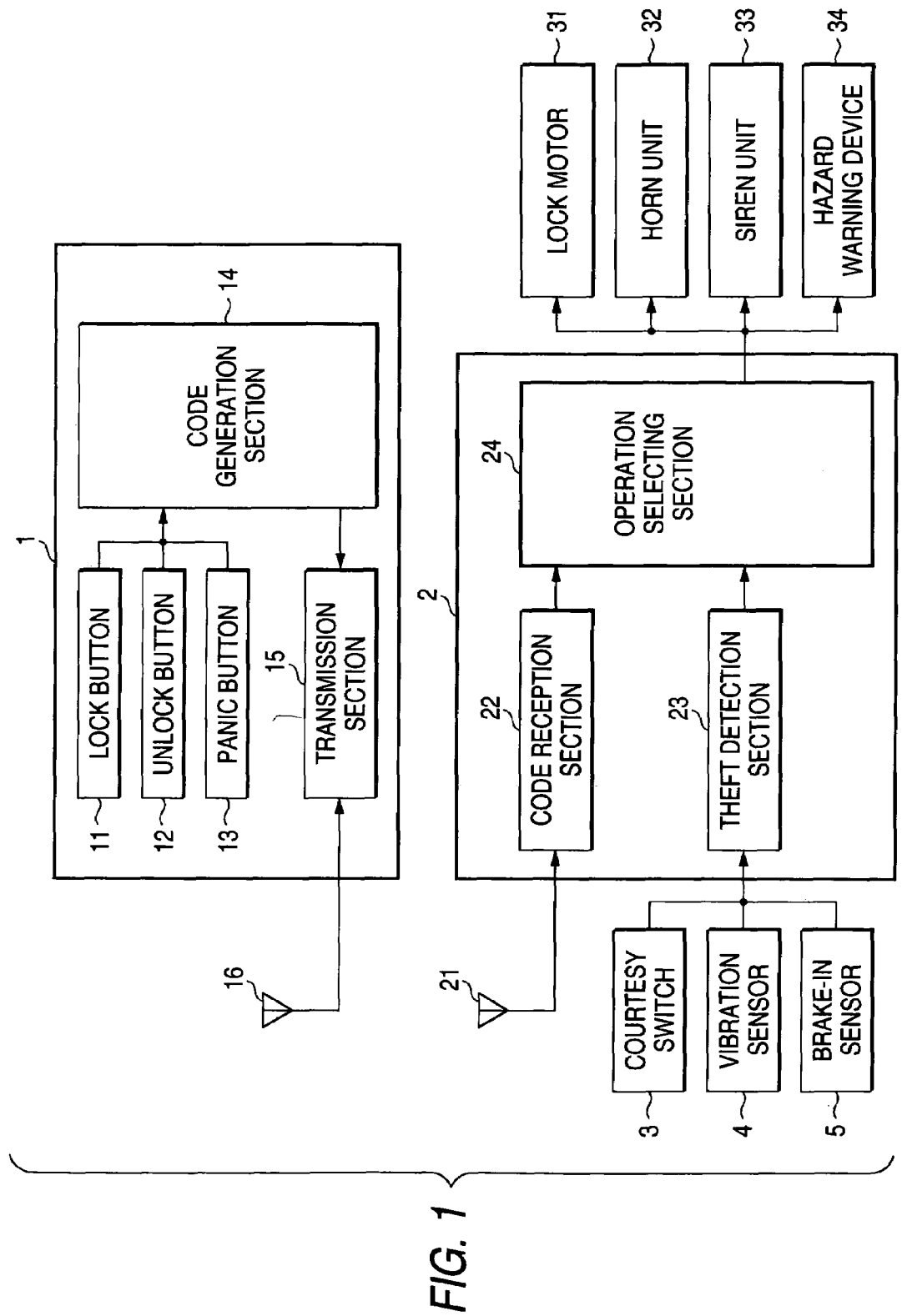
FIG. 1 shows a general configuration of a panic alarm system according to a first embodiment of the present invention.

FIG. 1 shows a general configuration of a panic alarm system according to a first embodiment of the invention. As shown in FIG. 1, the panic alarm system according to the first embodiment has a receiver 2 as a vehicular alarm apparatus and a transmitter 1 as a remote control apparatus.

The transmitter 1 is equipped with a lock button 11, an unlock button 12, a panic button 13, a code generation section 14, a transmission section 15, and an antenna 16.

The lock button 11 is a button for receiving input of an instruction to lock the doors of the vehicle that is mounted with the receiver 2. The unlock button 12 is a button for receiving input of an instruction to unlock the doors of the vehicle that is mounted with the receiver 2.

A user (e.g., driver) locks or unlocks the doors of the vehicle by depressing the lock button 11 or the unlock button 12. That is, the transmitter 1 functions as a remote manipulation terminal (remote key) of a wireless door lock apparatus of the vehicle that is mounted with the receiver 2.

The panic button 13 is a button for receiving a request for forcible output of an alarm (panic alarm) by the receiver 2.

Figure 2:
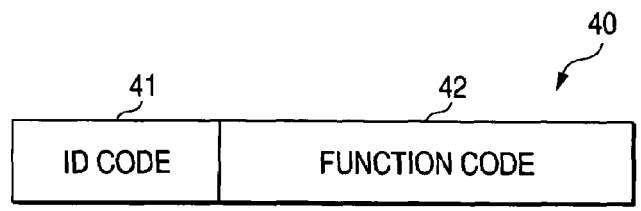
FIG. 2 shows the structure of transmission codes that are transmitted from a transmitter shown in FIG. 1.

The code generation section 14 is a processing section for generating transmission codes 40 to be transmitted to the receiver 2 on the basis of states (i.e., depressed or not depressed) of the lock button 11, the unlock button 12, and the panic button 13. As shown in FIG. 2 in a specific manner, the transmission codes 40 have an ID code 41 and a function code 42 (although a sync code etc. are also contained actually, they are omitted in FIG. 2).

The ID code 41 is a code to be used by the receiver 2 for identifying the transmitter 1. The function code 42 is a code indicating an operation instruction that is sent from the transmitter 1 to the receiver 2, that is, a lock instruction, an unlock instruction, or an alarm instruction. The code generation section 14 generates a first alarm (first panic alarm) instruction or a second alarm (second panic alarm) instruction in accordance with the states (i.e., depressed or not depressed) of the lock button 11, the unlock button 12, and the panic button 13.

More specifically, the code generation section 14 generates a function code "00" as the lock instruction, a function code "01" as the unlock instruction, a function code "10" as the first panic instruction, and the function code "11" as the second panic instruction.

The transmission section 15 modulates the transmission codes 40 generated by the code generation section 14 according to a prescribed modulation method and transmits modulated codes from the antenna 16.

The receiver 2 is equipped with an antenna 21, a code reception section 22, a theft detection section 23, and an operation selecting section 24, and is connected to courtesy switches 3, a vibration sensor 4, a break-in sensor 5, a lock motor 31, a horn unit 32, a siren unit 33, and a hazard warning device 34.

The courtesy switches 3 are in link with the doors of the vehicle that is mounted with the receiver 2. Each of the courtesy switches 3 is in an on-state when the corresponding door is open and is in an off-state when the corresponding door is closed (the courtesy switches 3 are provided for the respective doors of the vehicle).

The vibration sensor 4 is a sensor for detecting vibration of the vehicle body and/or the windows and outputting a detection result to the receiver 2. The break-in sensor 5 detects a suspicious person's breaking into the vehicle using ultrasonic waves or the like and outputs a detection result to the receiver 2.

The theft detection section 23 monitors whether a theft from the vehicle has occurred on the basis of the outputs of the courtesy switches 3, the vibration sensor 4, and the break-in sensor 5, and outputs a monitoring result to the operation selecting section 24 if a theft is detected.

On the other hand, the code reception section 22 receives, via the antenna 21, the transmission codes 40 sent from the transmitter 1, and performs demodulation processing and code analysis processing thereon. In the code analysis processing, first it is judged whether or not the received ID code 41 coincides with an ID code that is stored in the receiver 2. If the ID codes coincide with each other, the instruction indicated by the function code 42 is accepted.

The operation selecting section 24 controls the operations of the lock motor 31, the horn unit 32, the siren unit 33, and the hazard warning device 34 an the basis of the outputs of the code reception section 22 and the theft detection section 23. The lock motor 31 is a motor for locking or unlocking the doors of the vehicle. The operation selecting section 24 locks or unlocks the doors by controlling the operation of the lock motor 31.

The horn unit 32 is a device for emitting a warning sound around the vehicle. The operation selecting section 24 repels a suspicious person by causing the horn unit 32 to output a horn sound. The siren unit 33 outputs a voice around the vehicle to repel a suspicious person. An alternative configuration is such that the horn unit 32 is omitted and a single siren unit emits a warning sound and a voice.

The hazard warning device 34 communicates such information as completion of door locking to the user or the like by turning on the blinkers of the vehicle simultaneously.

As described above, the transmitter 1 transmits the first panic instruction (function code "10") or the second panic instruction (function code "11"). The operation selecting section 24 causes different alarm operations in response to the first and second panic instructions. For example, in response to the first panic instruction, the operation selecting section 24 may cause the siren unit 33 to output a synthesized alarm voice (e.g., "Leave the vehicle. We will call the police"). In response to the second panic instruction, the operation selecting section 24 may cause the horn unit 32 to output a warning sound.

The (first) alarm operation corresponding to the first panic instruction and the (second) alarm operation corresponding to the second panic instruction may be set arbitrarily so long as the first alarm should be less loud than the second alarm.

As described above, the alarm operation that is less loud than the ordinary alarm operation is provided, so that the user can choose between the alarm operations, which makes it possible to attain both of reduction of noise pollution and repelling of a suspicious person.

Next, a description will be made of a manipulation method for choosing between the first panic instruction and the second panic instruction. FIG. 3 illustrates a method for choosing the first panic instruction or the second panic instruction in accordance with the duration of manipulation on the panic button 13.

More specifically, the code generation section 14 chooses the first panic instruction if the panic button 13 is depressed for less than 2 seconds, and chooses the second panic instruction if the panic button 13 is depressed for 2 seconds or more.

Figure 3A:
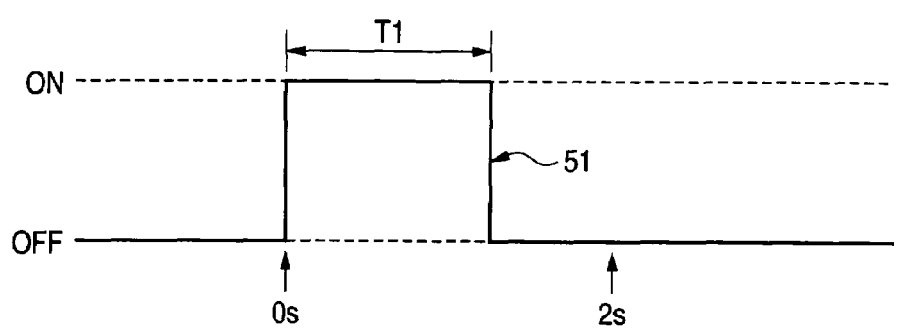
FIG. 3A illustrates a button manipulation to be performed in choosing a first panic instruction.
Figure 3B:
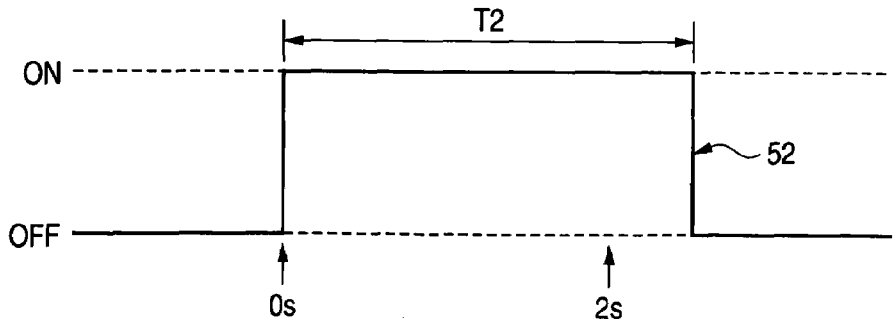
FIG. 3B illustrates a button manipulation to be performed in choosing a second panic instruction.

That is, the code generation section 14 starts measuring time at a time point when the panic button 13 is turned on. If an elapsed time T1 (sec) to turning-off of the panic button 13 is 0 second<T1<2 seconds as shown in FIG. 3A, the code generation section 14 chooses the first panic instruction. On the other hand, if an on-period T2 (sec) of the panic button 13 satisfies T2≧2 seconds as shown in FIG. 3B, the code generation section 14 chooses the second panic instruction.

That is, in this choosing method, the code generation section 14 chooses the first panic instruction at a time point when the panic button 13 returns to the off position if the on-period of the panic button 13 is shorter than 2 seconds. The code generation section 14 chooses the second panic instruction at a time point when the on-period has reached 2 seconds.

Next, a description will be made of respective processes executed by the code generation section 14, the code reception section 22, and the operation selecting section 24. FIG. 4 is a flowchart showing the process executed by the code generation section 14. This routine is part of a main routine that is executed repeatedly while the transmitter 1 is in a power-on state.

As shown in FIG. 4, first, the code generation section 14 judges whether or not the lock button 11 is depressed, that is, whether or not the lock button 11 is in an on-state (step S101). If the lockbutton 11 is in the on-state (step S101: yes), the code generation section 14 sets the function code 42 to "00" (step S112).

on the other hand, if the lock button 11 is not in the on-state (step S101: no), the code generation section 14 judges whether or not the unlock button 12 is depressed, that is, whether or not the unlock button 12 is in an on-state (step S102).

If the unlock button 12 is in the on-state (step S102: yes), the code generation section 14 sets the function code 42 to "01" (step S113).

On the other hand, if the unlock button 12 is not in the on-state (step 3102: no), the code generation section 14 judges whether or not the panic button 13 is depressed, that is, whether or not the panic button 13 is in an on-state (step S103).

If the panic button 13 is in the on-state (step S103: yes), the code generation section 14 judges whether or not a value of a transmission flag is equal to "1" (step S104). The transmission flag takes a value "0" or "1," its initial state value being "0."

If the value of the transmission flag is not equal to "1" (step S104: no), the code generation section 14 increments, by "1," the value corresponding to an elapsed time T from turning-on of the panic button 13 (step S105). The value corresponding to the elapsed time T has an initial value "0."

After the execution of step S105, the code generation section 14 judges whether or not the elapsed time T is longer than or equal to 2 seconds (step S106). More specifically, since the value corresponding to the elapsed time T is incremented every processing cycle time, the condition T≧2 (sec) is satisfied if the value corresponding to the elapsed time T is greater than or equal to "40" in the case where the processing cycle time is equal to 50 ms, for example.

If the code generation section 14 concludes at step S106 that the elapsed time T is longer than or equal to 2 seconds (step S106: yes), the code generation section 14 sets the function code 42 to "11" (step S107) and sets the value of the transmission flag to "1" (step S108). The transmission flag takes a value "0" or "1," its initial state value being "0."

Incidentally, if the code generation section 14 concludes at step S103 that the panic button 13 is not in the on-state (step S103: no), the code generation section 14 judges whether or not the value of the transmission flag is equal to "1" (step S114).

If the value of the transmission flag is equal to "1" (step S114: yes), the code generation section 14 resets the transmission flag, that is, sets it to "0" (step S115).

On the other hand, if the value of the transmission flag is not equal to "1" (step S114: no), the code generation section 14 judges whether or not the elapsed time T is longer than 0 second and shorter than 2 seconds (step S116). If the elapsed time T is longer than 0 second and shorter than 2 seconds (step S116: yes), the code generation section 14 sets the function code 42 to "10" (step S117).

After the execution of step S108, S115, or S117, the code generation section 14 resets the value corresponding to the elapsed time T (step S109).

After the execution of step S109, S112, or S113, the code generation section 14 generates transmission codes 40 by adding the ID code 41 peculiar to the transmitter 1 to the function code 42 and causes the transmission section 15 to transmit the generated transmission codes 40 (step S110).

The code generation section 14 exits this routine if step S110 has been executed; if the value of the transmission flag is equal to "1" at step S104 (step S104: yes); if the elapsed time T is shorter than 2 seconds at step S106 (step S106: no); or if the elapsed time T is equal to 0 second or longer than or equal to 2 seconds at step S116 (step S116: no).

Next, the process that is executed by the code reception section 22 will be described with reference to a flowchart of FIG. 5. This routine is part of a main routine that is executed repeatedly while the receiver 2 is in a power-on state.

Figure 5:
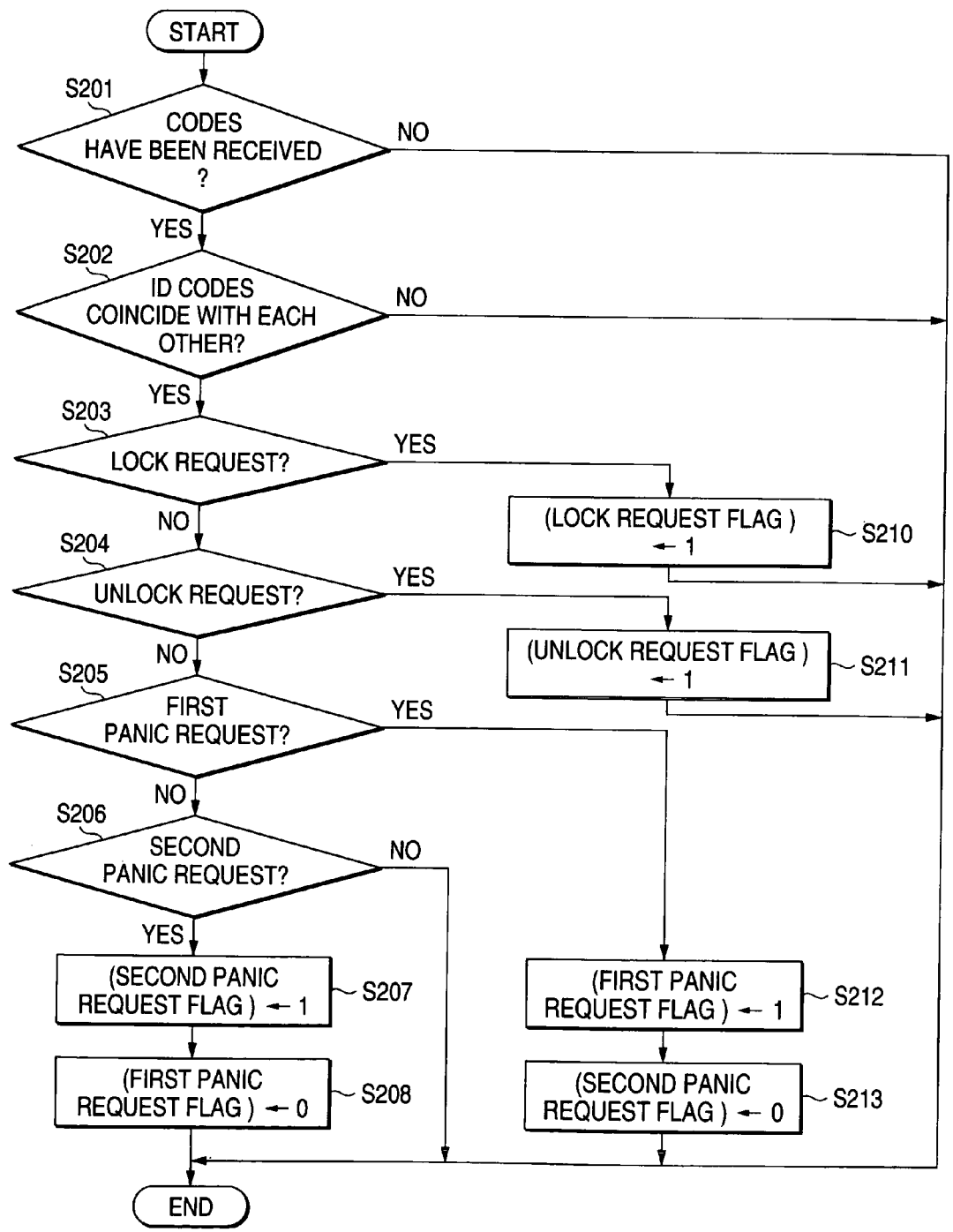
FIG. 5 is a flowchart showing a process that is executed by a code reception section shown in FIG. 1.

As shown in FIG. 5, first, the code reception section 22 judges whether or not the antenna 21 has received codes from the transmitter 1 (step S201). If the antenna 21 has received codes from the transmitter 1 (step S201: yes), the code reception section 22 judges whether or not the received ID code 41 coincides with the ID code that is stored in the receiver 2 (step S202).

If the ID codes coincide with each other (step S202: yes), the code reception section 22 judges whether or not the function code 42 is "00," that is, the function code 42 means the lock instruction (lock request) (step S203).

If the function code 42 is "00" (step S203: yes), the code reception section 22 sets the value of a lock request flag to "1" (step S210). The lock request flag takes a value "0" or "1," its initial state value being "0."

On the other hand, if the function code 42 is not "00" (step S203: no), the code reception section 22 judges whether or not the function code 42 is "01," that is, the function code 42 means the unlock instruction (unlock request) (step S204).

If the function code 42 is "01" (step S204: yes), the code reception section 22 sets the value of an unlock request flag to "1" (step S211). The unlock request flag takes a value "0" or "1," its initial state value being "0."

On the other hand, if the function code 42 is not "01" (step S204: no), the code reception section 22 judges whether or not the function code 42 is "10," that is, the function code 42 means the first panic request (step S205).

If the function code 42 is "10" (step S205: yes), the code reception section 22 sets the value of a first panic request flag to "1" (step S212) and sets the value of a second panic request flag to "0" (step S213). The first panic request flag and the second panic request flag each takes a value "0" or "1," their initial state values being "0."

On the other hand, if the function code 42 is not "10" (step S205: no), the code reception section 22 judges whether or not the function code 42 is "11," that is, the function code 42 means the second panic request (step S206).

If the function code 42 is "11" (step S206: yes), the code reception section 22 sets the value of the second panic request flag to "1" (step S207) and sets the value of the first panic request flag to "0" (step S208).

The code reception section 22 exits this route if the antenna 21 has not received codes from the transmitter 1 (step S201: no); if the ID codes do not coincide with each other (step S202: no); if the function code 42 is not "11" (step S206: no); or when step S208, S213, S211, or S210 has been executed.

Next, the process that is executed by the operation selecting section 24 will be described with reference to a flowchart of FIG. 6. This routine is part of the main routine that is executed repeatedly while the receiver 2 is in a power-on state.

Figure 6:
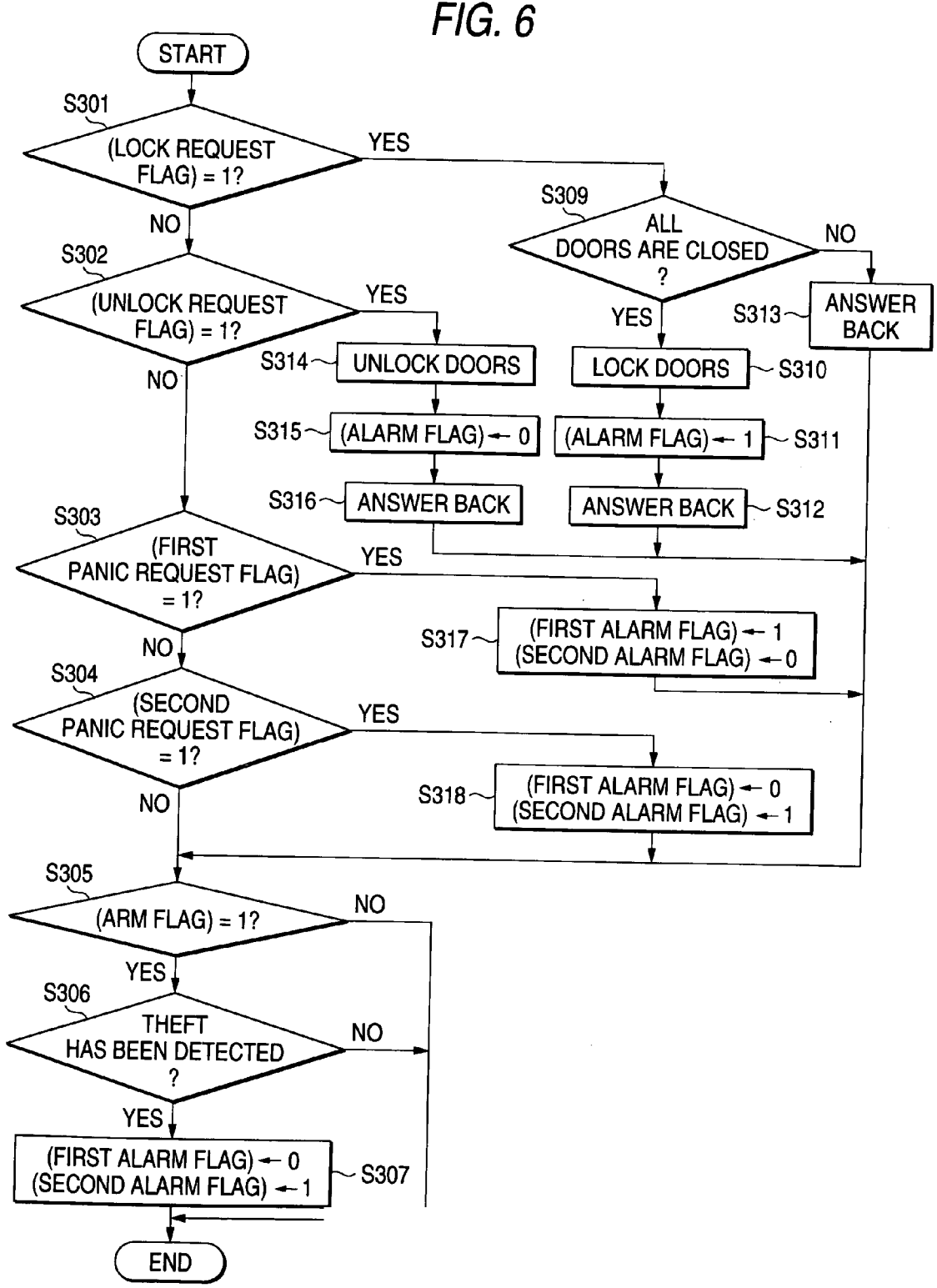
FIG. 6 is a flowchart showing a process that is executed by an operation selecting section shown in FIG. 1.

As shown in FIG. 6, first, the operation selecting section 24 judges whether or not the value of the lock request flag is equal to "1" (step S301). If the value of the lock request flag is equal to "1" (step S301: yes), the operation selecting section 24 judges on the basis of the outputs of the courtesy switches 3 whether or not all the doors of the vehicle are closed (step S309).

If all the doors are closed (stp S309: yes), the operation selecting section 24 locks the doors by causing the lock motor 31 to operate (step S310) and sets the value of an arm flag to "1" (step S311). The arm flag is a flag for specifying whether or not the theft detection section 23 should perform automatic theft detection processing. More specifically, the arm flag takes a value "0" or "1," and the theft detection processing should not be performed if the value of the arm flag is equal to "0" and should be performed if the value of the arm flag is equal to "1." The initial state value of the arm flag is "0." Therefore, in this routine, the theft detection processing is activated automatically when the doors of the vehicle have been locked in response to the lock request. That is, the arming mode is activated to start monitoring theft.

When step S311 has been executed, the operation selecting section 24 sets the value of the lock request flag to "0" and informs the user of the completion of locking by using the hazard warning device 34, the horn unit 32, or the like (so called answering-back) (step S312).

If there is an unclosed door (step S309: no), the operation selecting section 24 answers back to inform the user of the situation that the doors cannot be locked because of the presence of an unclosed door (step S313).

On the other hand, if the value of the lock request flag is not equal to "1" (step S301: no), the operation selecting section 24 judges whether or not the value of the unlock request flag is equal to "1" (step S302).

If the value of the unlock request flag is equal to "1" (step S302: yes), the operation selecting section 24 unlocks the doors by causing the lock motor 31 to operate (step S314), sets the value of the arm flag to "0" (step S315), and then answers back to inform the user of the completion of unlocking by using the hazard warning device 34, the horn unit 32, or the like (step S316). When the value of the arm flag becomes "0", the disarming mode is activated to terminate monitoring theft.

On the other hand, if the value of the unlock request flag is not equal to "1" (step S302: no), the operation selecting section 24 judges whether or not the value of the first panic request flag is equal to "1" (step S303).

If the value of the first panic request flag is equal to "1" (step S303: yes), the operation selecting section 24 sets the values of a first alarm flag and a second alarm flag to "1" and "0," respectively (step S317). The first alarm flag and the second alarm flag each takes a value "0" or "1," their initial values being "0."

On the other hand, if the value of the first panic request flag is not equal to "1" (step S303: no), the operation selecting section 24 judges whether or not the value of the second panic request flag is equal to "1" (step S304).

If the value of the second panic request flag is equal to "1" (step S304: yes), the operation selecting section 24 sets the values of the first alarm flag and the second alarm flag to "0" and "1," respectively (step S318).

The operation selecting section 24 judges whether or not the value of the arm flag is equal to "1" (step S305) if the value of the second panic request flag is not equal to "1" (step S304: no) or when step S312, S313, S316, S317, or S318 has been executed.

If the value of the arm flag is equal to "1" (step S305: yes), the operation selecting section 24 judges whether or not the theft detection section 23 has detected a theft (step S306).

If the theft detection section 23 has detected a theft (step S306: yes), the operation selecting section 24 sets the values of the first alarm flag and the second alarm flag to "0" and "1," respectively (step S307).

The operation selecting section 24 exits this routine if the value of the arm flag is not equal to "1" (step S305: no), if the theft detection section 23 has not detected a theft (step S306: no), or when step S307 has been executed.

Next, an alarm operation of the operation selecting section 24 will be described with reference to a flowchart of FIG. 7. This routine is part of the main routine that is executed repeatedly while the receiver 2 is in a power-on state.

Figure 7:
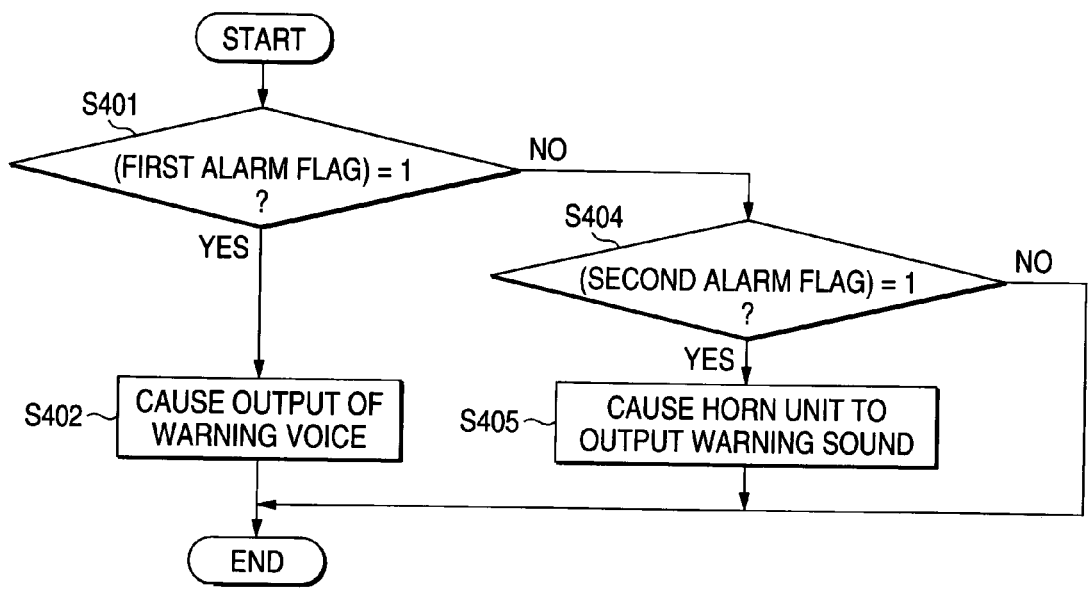
FIG. 7 is a flowchart showing an alarm operation of the operation selecting section shown in FIG. 1.

As shown in FIG. 7, first, the operation selecting section 24 judges whether or not the value of the first alarm flag is equal to "1" (step S401). If the value of the first alarm flag is equal to "1" (step S401: yes), the operation selecting section 24 causes output of a warning voice of the first alarm and sets the value of the first alarm flag to "0" (step S402).

On the other hand, if the value of the first alarm flag is not equal to "1" (step S401: no), the operation selecting section 24 judges whether or not the value of the second alarm flag is equal to "1" (step S404).

If the value of the second alarm flag is equal to "1" (step S404: yes), the operation selecting section 24 causes the horn unit 32 to output a warning sound of the second alarm and sets the value of the second alarm flag to "0" (step S405).

The operation selecting section 24 exits this routine if the value of the second alarm flag is not equal to "1" (step S404: no) or when step S402 or S405 has been executed.

As described above with reference to FIGS. 3-7, the transmitter 1 chooses the first Panic instruction or the second panic instruction depending on the duration of depression of the panic button 13 and causes the receiver 2 to perform the different alarm operations in response to those instructions. The first alarm corresponding to the first panic instruction is made less loud than the second alarm corresponding to the second panic instruction, and the second alarm is made the same as the alarm that is issued upon detection of a theft.

Incidentally, in the case of FIGS. 3A and 3B, whether to select the first panic instruction or the second panic instruction is determined depending on whether the on-period of the panic button 13 is longer than or equal to 2 seconds. However, the method for selecting the first panic instruction or the second panic instruction is not limited to this method.

For example, the following method may be employed. The first panic instruction is selected and generation and transmission of the function code are started at a time point when the panic button 13 is turned on. Switching is made from the first panic instruct-ion to the second panic instruction at a time point when a prescribed time (e.g., 2 seconds) has passed from the turning-on of the panic button 13. In this case, the alarm operation of the receiver 2 is such that it first issues the first alarm and then switching is made to the second alarm.

Figure 8A:
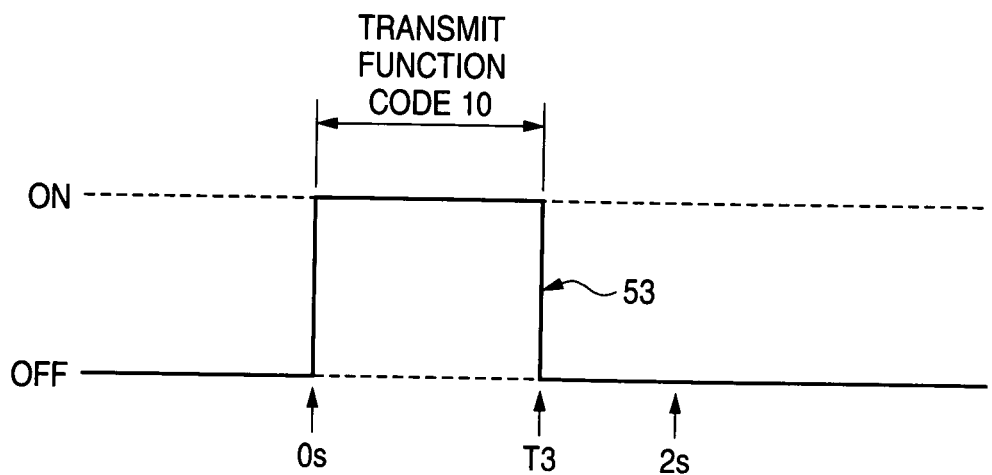
FIG. 8A illustrates a manipulation for causing transmission of a first panic instruction during a prescribed period from the start of the manipulation.
Figure 8B:
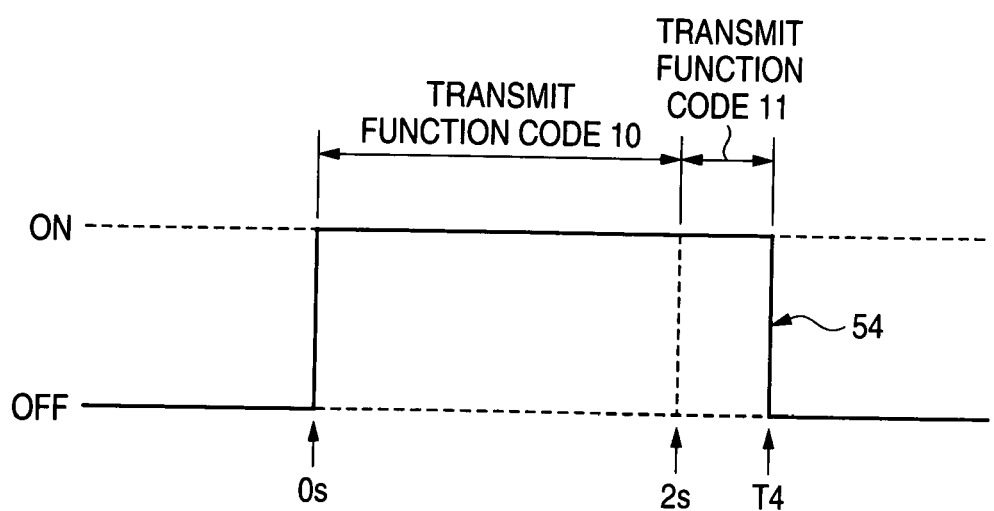
FIG. 8B illustrates a manipulation for causing transmission of a second panic instruction after transmission of a first panic instruction.

FIG. 8 illustrates manipulations that are performed in the case where the function code is generated and transmitted at a time point when a manipulation on the panic button 13 is started. As shown in FIG. 8A, generation and transmission of the function code "10" and a time measurement is started at a time point when the panic button 13 is turned on. If an elapsed time T3 (sec) to turning-off of the panic button 13 satisfies a relationship 0 second<T3<2 seconds, only the function code "10" is generated and transmitted.

On the other hand, in the case where an elapsed time T2 (sec) to turning-off of the panic button 13 satisfies a relationship T4≧2 seconds, the generation of the function code "01"

is stopped and generation and transmission of the function code "11" are started at a time point when the elapsed time T4 has reached 2 seconds.

A process that is executed by the code generation section 14 in the case where generation and transmission of the function code are started at a time point when a manipulation on the panic button 13 is started will be described below with reference to a flowchart of FIG. 9. This routine is part of the main routine that is executed repeatedly while the transmitter 1 is in a power-on state.

Figure 9:
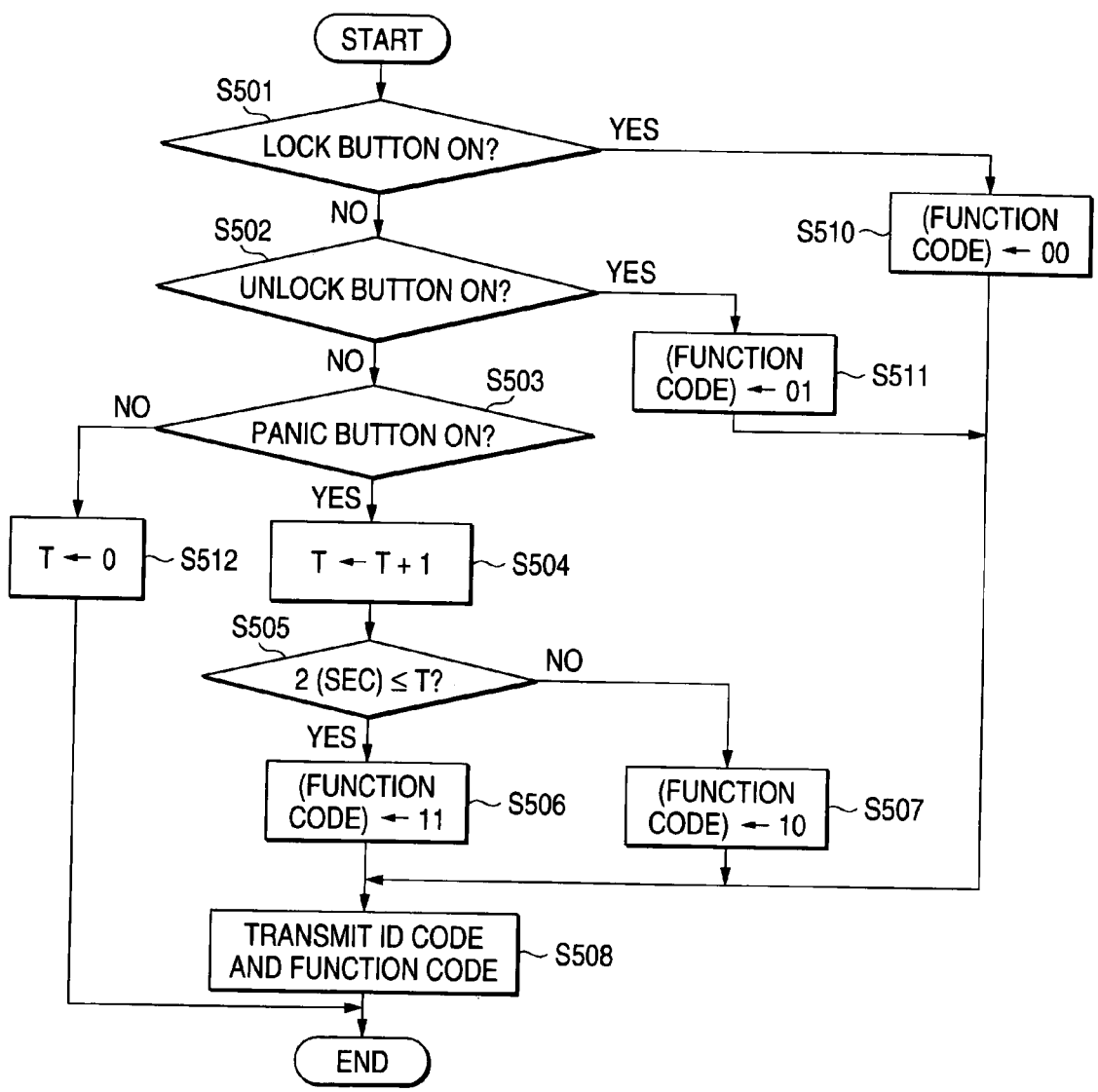
FIG. 9 is a flowchart showing a process that is executed by the code generation section in the case where generation and transmission a function code is started at the start of a manipulation.

As shown in FIG. 9, first, the code generation section 14 judges whether or not the lock button 11 is depressed, that is, whether or not the lock button 11 is in an on-state (step S501). If the lock button 11 is in the on-state (step S501: yes), the code generation section 14 sets the function code 42 to "00" (step S510).

On the other hand, If the lock button 11 is not in the on-state (step S501., no), the code generation section 14 judges whether or not the unlock button 12 is depressed, that is, whether or not the unlock button 12 is in an on-state (step S502).

If the unlock button 12 is in the on-state (step S502: yes), the code generation section 14 sets the function code 42 to "01" (step S511).

On the other hand, if the unlock button 12 is not in the on-state (step S502: no), the code generation section 14 judges whether or not the panic button 13 is depressed, that is, whether or not the panic button 13 is in an on-state (step S503).

If the panic button 13 is not in the on-state (step S503: no), the code generation section 14 resets the value corresponding to an elapsed time T (step S512). On the other hand, if the panic button 13 is in the on-state (step S503: yes), the code generation section 14 increments, by "1," the value corresponding to the elapsed time T from turning-on of the panic button 13 (step S504).

After the execution of step S504, the code generation section 14 judges whether or not the elapsed time T is longer than or equal to 2 seconds (step S505). If the elapsed time T is longer than or equal to 2 seconds (step S505: yes), the code generation section 14 sets the function code 42 to "11" (step S506). On the other hand, if the elapsed time T is shorter than 2 seconds (step S505: no), the code generation section 14 sets the function code 42 to "10" (step S507).

After the execution of step S506, S507, S510, or S511, the code generation section 14 generates transmission codes 40 by adding the ID code 41 peculiar to the transmitter 1 to the function code 42 and causes the transmission section 15 to transmit the generated transmission codes 40 (step S508).

The code generation section 14 exits this routine when step S508 or S512 has been executed.

Even in the case where the transmitter 1 employs the routine of FIG. 9, the receiver 2 may employ the above-described routines (see FIGS. 5-7). However, in this case, if the user continues to depress the panic button 13, switching is made from the first panic instruction to the second panic instruction at a time point when 2 seconds have elapsed. Therefore, a warning voice corresponding to the first panic instruction is interrupted. This can be prevented by switching to a second panic warning sound after a first panic warning voice of at least one phrase has been output (if the warning voice is being output after a judgment result "yes" was produced at step S404 of FIG. 7, step S405 is skipped until completion of the warning voice (one phrase).

Incidentally, the second alarm that is used as a panic alarm need not always be the same as the alarm that is issued at the time of automatic detection of a theft; an alarm (main alarm) that is issued at the time of automatic detection of a theft may be set independently.

Figure 10:
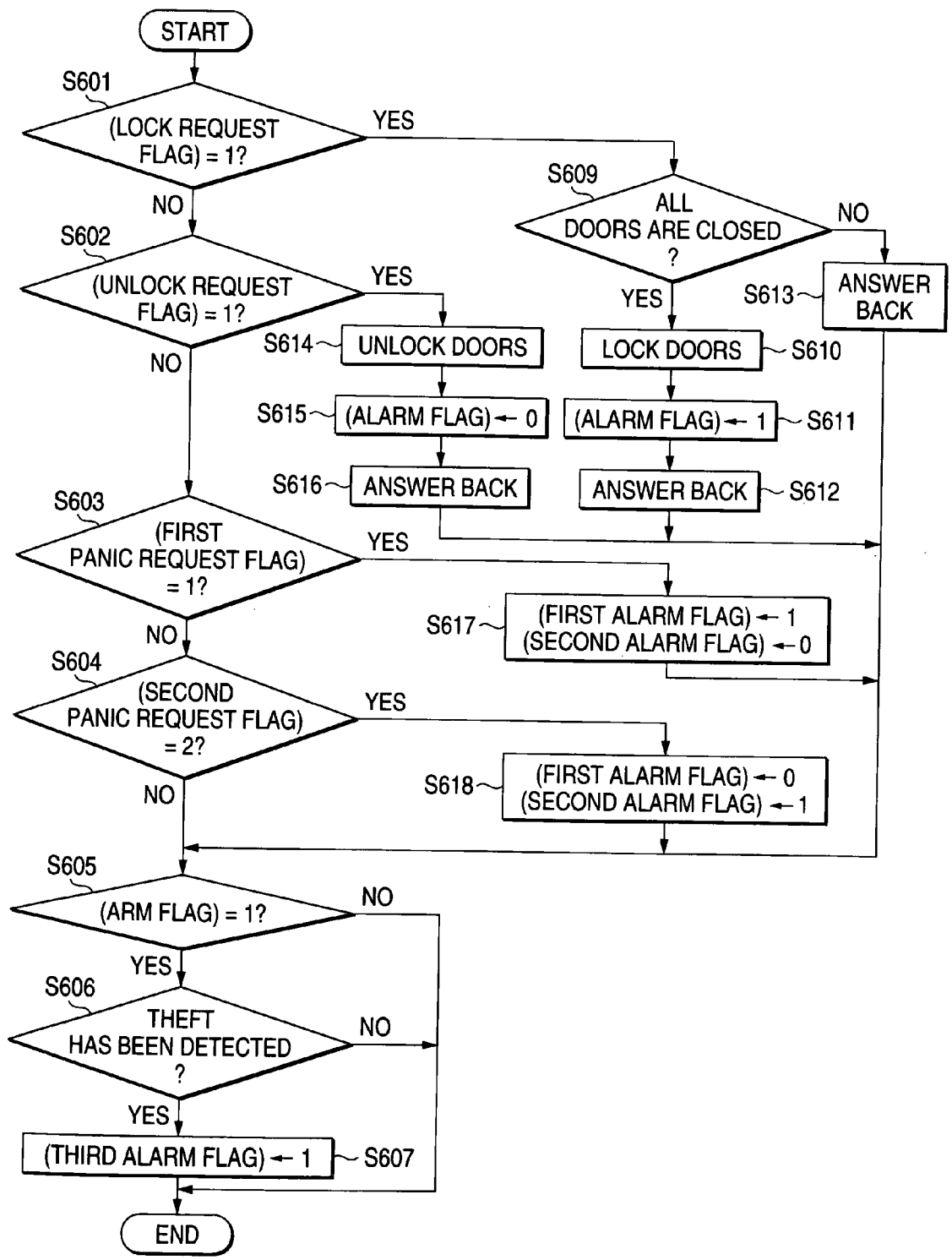
FIG. 10 is a flowchart showing a process that is executed by the operation selecting section in the case where a main alarm is set independently.

FIG. 10 is a flowchart showing a process that is executed by the operation selecting section 24 in the case where an alarm (main alarm) that is issued at the time of automatic detection of a theft is set independently. This flowchart is the same as that of FIG. 6 except step S607 that is executed upon detection of a theft. The value of an independent third alarm flag instead of the second alarm flag is set at step S607. The description of the other steps is omitted.

Figure 11:
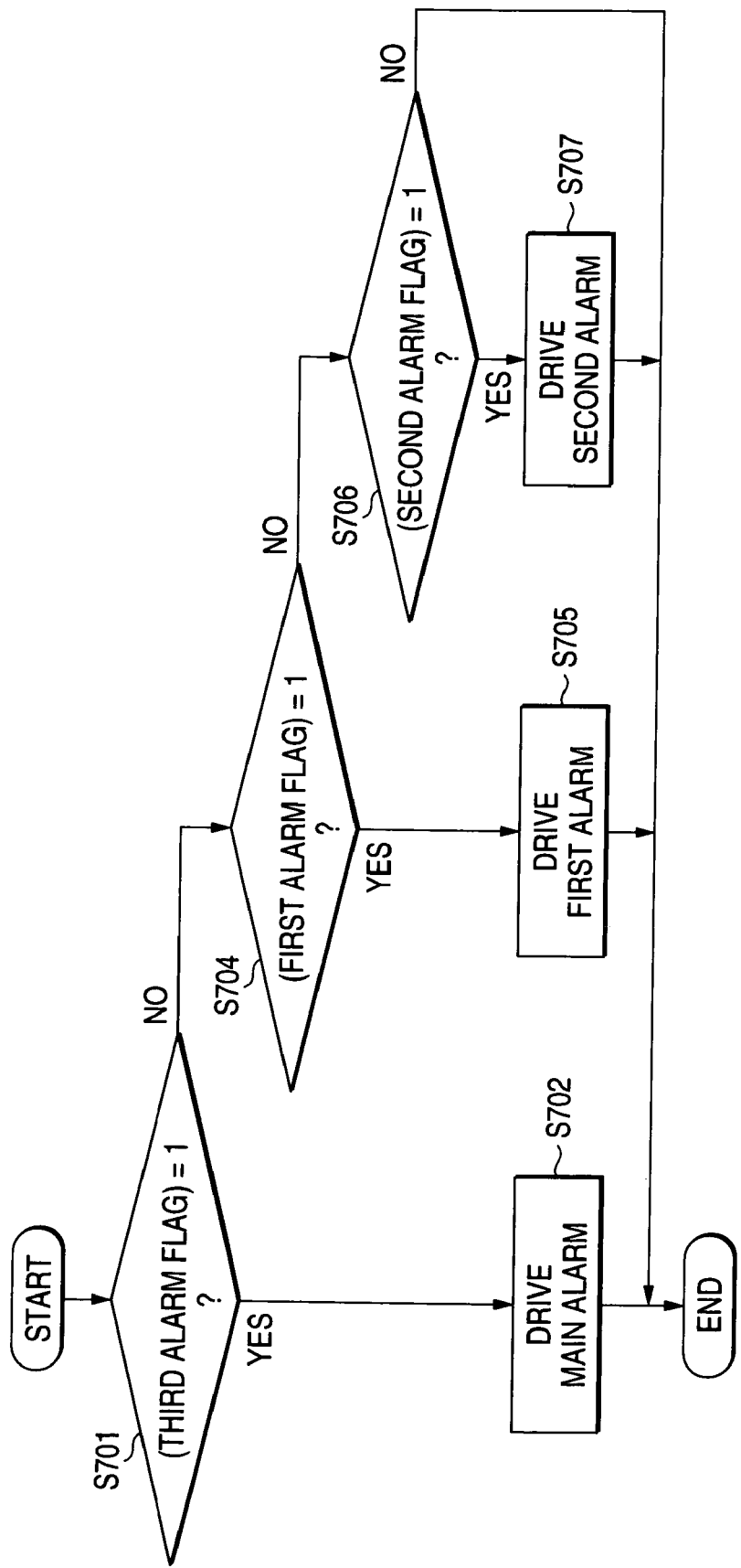
FIG. 11 is a flowchart showing an alarm operation that is performed by the operation selecting section in the case where the main alarm is set independently.

FIG. 11 is a flowchart showing an alarm operation that is performed by the operation selecting section 24 in the case where the main alarm is set independently. This routine is part of the main routine that is executed repeatedly while the receiver 2 is in a power-on state.

As shown in FIG. 11, first, the operation selecting section 24 judges whether or not the value of the third alarm flag is equal to "1" (step S701). If the value of the third alarm flag is equal to "1" (step S701: yes), the operation selecting section 24 causes issuance of a third alarm (as a first priority operation) and sets the value of the third alarm flag to "0" (step S702).

On the other hand, if the value of the third alarm flag is not equal to "1" (step S701: no), the operation selecting section 24 judges whether or not the value of the first alarm flag is equal to "1" (step S704).

If the value of the first alarm flag is equal to "1" (step S704: yes), the operation selecting section 24 causes issuance of the first alarm and sets the value of the first alarm flag to "0" (step S705).

On the other hand, if the value of the first alarm flag is not equal to "1" (step S704: no), the operation selecting section 24 judges whether or not the value of the second alarm flag is equal to "1" (step S706).

If the value of the second alarm flag is equal to "1" (step S706: yes), the operation selecting section 24 causes issuance of the second alarm and sets the value of the second alarm flag to "0" (step S707).

The operation selecting section 24 exits this routine if the value of the second alarm flag is not equal to "1" (step S706: no) or when step S702, S705, or S707 has been executed.

Next, a description will be made of variations of the method for choosing between the first panic instruction (first panic operation) and the second panic instruction (second panic operation). The method for choosing between the first panic instruction (first panic operation) and the second panic instruction (second panic operation) is generally classified into a method in which the transmitter 1 generates different function codes corresponding to the first panic instruction and the second panic instruction and a method in which the receiver 2 chooses between the first panic operation and the second panic operation.

One method for generating different function codes corresponding to the first panic instruction and the second panic instruction in the transmitter 1 is such that respective manipulation buttons corresponding to the first panic instruction and the second panic instruction are provided. In this case, the corresponding function button code can be transmitted immediately after manipulation of the first panic button or the second panic button.

Another method is such that a shift button is provided in the transmitter 1 instead of the panic button (s) and the function code corresponding to the first panic instruction or the second panic instruction is transmitted when the shift button and another button are manipulated simultaneously. For example, the function code corresponding to the first panic instruction is transmitted when the lock button 11 and the shift button are manipulated simultaneously, and the function code corresponding to the second panic instruction is transmitted when the unlock button 12 and the shift button are manipulated simultaneously.

Another method is such that a shift button is provided in the transmitter 1 instead of the panic button (s) and the function code corresponding to the first panic instruction or the second panic instruction is transmitted depending on the duration of simultaneous manipulation of the shift button and another button. For example, the function code corresponding to the first panic instruction is transmitted when both of the lock button 11 and the shift button have been manipulated for less than 2 seconds, and the function code corresponding to the second panic instruction is transmitted when both of the lock button 11 and the shift button have been manipulated for 2 seconds or more.

Still another method is such that the function code corresponding to the first panic instruction or the second panic instruction is transmitted when a button of another function has been depressed for a prescribed time or more. For example, a lock request is transmitted immediately after turning-on of the lock button 11. The function code corresponding to the first panic instruction is transmitted when the lock button 11 has been turned on during a period that is longer than or equal to 2 seconds and shorter than 4 seconds. And the function code corresponding to the second panic instruction is transmitted when the lock button 11 has been kept on for 4 seconds or more.

Other various methods are available: the function code corresponding to the first panic instruction or the second panic instruction may be transmitted depending on the number of manipulations performed in a prescribed time on the lock button 11, the unlock button 12, a shift button, or another button or the combination of manipulations performed on those buttons in a prescribed time.

On the other hand, one method for choosing between the first panic operation and the second panic operation in the receiver 2 is such that the receiver 2 receives a single function code indicating a panic request from the transmitter 1 and chooses the first panic operation or the second panic operation in accordance with the duration of its reception. For example, the first panic operation is chosen if the duration of reception of a function code indicating a panic request is shorter than 2 seconds, and the second panic operation is chosen if the duration is longer than or equal to 2 seconds.

In this method, the transmitter 1 may be equipped with a dedicated panic button for generation of a function code indicating a panic request or may be configured so as to generate a function code indicating a panic request when a shift button and another button (e.g., the shift button and the lock button 11) are manipulated simultaneously.

Figure 12:
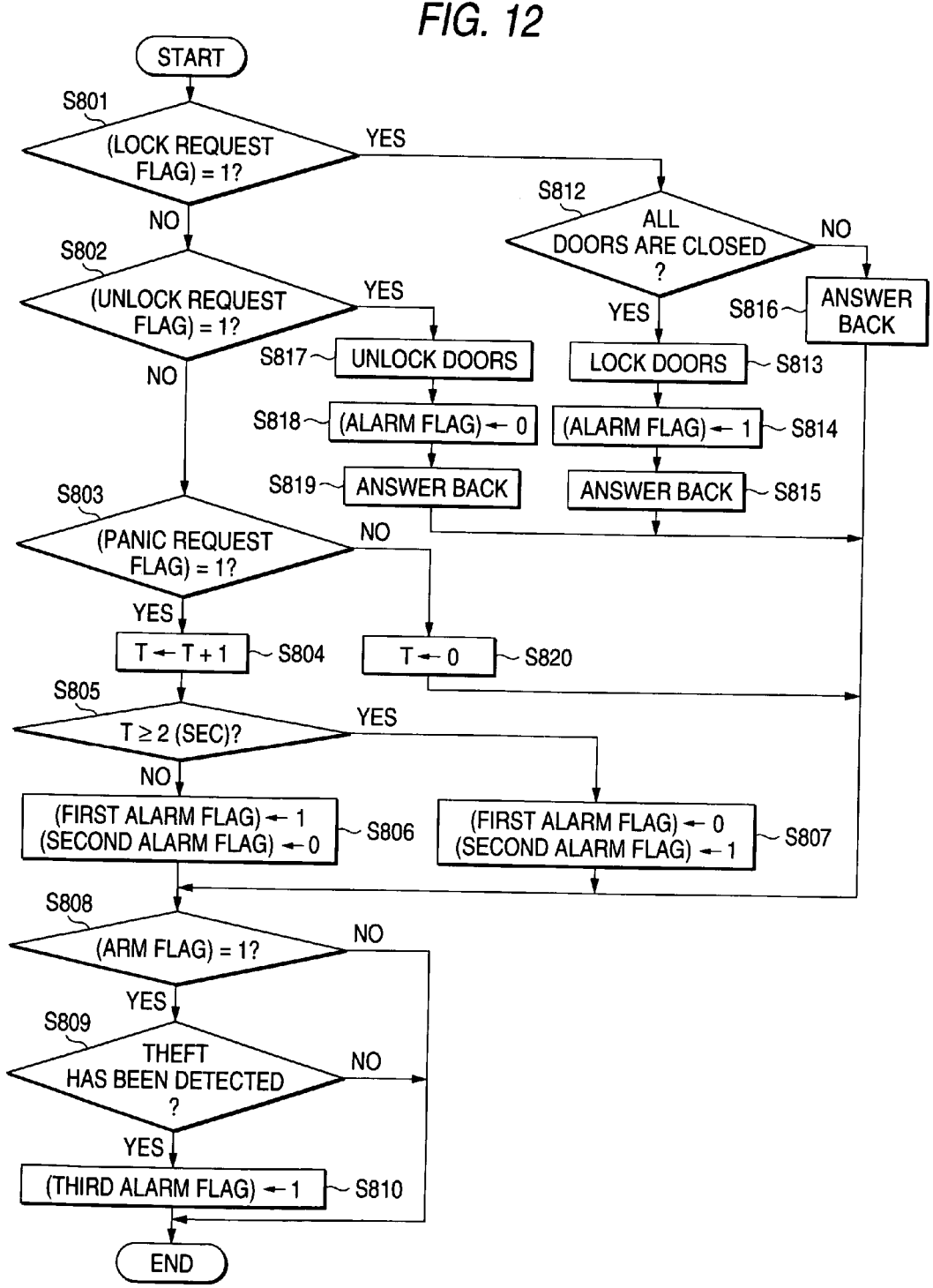
FIG. 12 is a flowchart showing a process that is executed by the operation selecting section in the case where a single code indicating a panic request is received from the transmitter.

FIG. 12 is a flowchart showing a process that is executed by the operation selecting section 24 in the case where this method is employed. As shown in FIG. 12, first, the operation selecting section 24 judges whether or not the value of the lock request flag is equal to "1" (step S801). If the value of the lock request flag is equal to "1" (step S801: yes), the operation selecting section 24 judges on the basis of the outputs of the courtesy switches 3 whether or not all the doors of the vehicle are closed (step S812).

If all the doors are closed (step S812: yes), the operation selecting section 24 locks the doors by causing the lock motor 31 to operate (step S813) and sets the value of an arm flag to "1" (step S314).

When step S814 has been executed, the operation selecting section 24 sets the value of the lock request flag to "0" and answers back to inform the user of the completion of locking by using the hazard warning device 341 the horn unit 32, or the like (step S815).

If there is an unclosed door (step S312: no), the operation selecting section 24 answers back to inform the user of the situation that the doors cannot be locked because of the presence of an unclosed door (step S816).

On the other hand, if the value of the lock request flag is not equal to "1" (step S801: no), the operation selecting section 24 judges whether or not the value of the unlock request flag is equal to "1" (step S802).

If the value of the unlock request flag is equal to "1" (step S802: yes), the operation selecting section 24 unlocks the doors by causing the lock motor 31 to operate (step S817), sets the value of the arm flag to "0" (step S818), and then answers back to inform the user of the completion of unlocking by using the hazard warning device 34, the horn unit 32, or the like (step S819).

On the other hand, if the value of the unlock request flag is not equal to "1" (step S802: no), the operation selecting section 24 judges whether or not the value of a panic request flag is equal to "1" (step S803). If the value of the first panic request flag is not equal to "1" (step S803: no), the operation selecting section 24 resets the value corresponding to an elapsed time T (step S820).

On the other hand, if the value of the panic request flag is equal to "1" (step S803: yes), the operation selecting section 24 increments, by "1," the value corresponding to the elapsed time from a time point when the value of the panic request flag became "1" (step S804).

After the execution of step S804, the operation selecting section 24 judges whether or not the elapsed time T is longer than or equal to 2 seconds (step S805) If the elapsed time T is longer than or equal to 2 seconds (step S805: yes), the operation selecting section 24 sets the values of a first alarm flag and a second alarm flag to "0" and "1," respectively (step S807).

If the elapsed time T is shorter than 2 seconds, (step S805: no), the operation selecting section 24 sets the values of the first alarm flag and the second alarm flag to "1" and "0," respectively (step S806).

The operation selecting section 24 judges whether or not the value of the arm flag is equal to "1" (step S808), when step S606, S807, S815, S816, S619, or S820 has been executed.

If the value of the arm flag is equal to "1" (step S808: yes), the operation selecting section 24 judges whether or not the theft detection section 23 has detected a theft (step S809).

If the theft detection section 23 has detected a theft (step S809: yes), the operation selecting section 24 sets the value of a third alarm flag to "1" (step S810).

The operation selecting section 24 exits this routine if the value of the arm flag is not equal to "1" (step S808: no), if the theft detection section 23 has not detected a theft (step S809: no), or when step S810 has been executed.

Another method for choosing the first panic operation or the second panic operation in the receiver 2 is such that the receiver 2 receives a plurality of function codes simultaneously and chooses the first panic operation or the second panic operation in accordance with a combination of the received function codes.

For example, it is assumed that the transmitter 1 is equipped with the lock button 11, the unlock button 12, and a shift button and function codes corresponding to the respective buttons are transmitted upon manipulation of the respective buttons. The first panic operation is chosen if the function codes corresponding to the lock button 11 and the shift button are received, and the second panic operation is chosen if the function codes corresponding to the unlock button 12 and the shift button are received.

Another method is such that the first panic operation or the second panic operation is chosen by using the combination of function codes received from the transmitter 1 and the duration of reception of each function code. For example, the first panic operation is chosen if function codes corresponding to the lock button 11 and the shift button have been received simultaneously for less than 2 seconds, and the second panic operation is chosen if the above function codes have been received for 2 seconds or more.

Still another method is such that the first panic operation or the second panic operation is chosen by using another function code received from the transmitter 1 and the duration of its reception. For example, a lock request flag is set immediately after reception of the function code corresponding to the lock button 11. A first panic request flag is set if the function code corresponding to the lock button ll has been received for a period that is longer than or equal to 2 seconds and shorter than 4 seconds, and a second panic request flag is set if the above function code has been received for 4 seconds or more. This makes it possible to choose between the first panic operation and the second panic operation.

Other various methods are available: for example, choosing between the first panic operation and the second panic operation may be made by using the number of manipulations performed in a prescribed time on one of buttons corresponding to various function codes etc., the combination of manipulations performed on those buttons in a prescribed time, or the duration of reception of each of those function codes.

As described above, in the panic alarm system according to the first embodiment, a user can select an arbitrary alarm operation from among plural alarm operations with a simple configuration and manipulation. Further, it is possible to repel a suspicious person while reducing noise pollution by selecting a warning voice or a horn sound that is shorter than an ordinary one.

Another embodiment is such that when a second panic instruction is received, the operation selecting section 24 causes output of a main alarm by establishing a pseudo-theft state by turning on the courtesy switches 3 or the sensor 4 or 5 intentionally.

Embodiment 2

Figure 13:
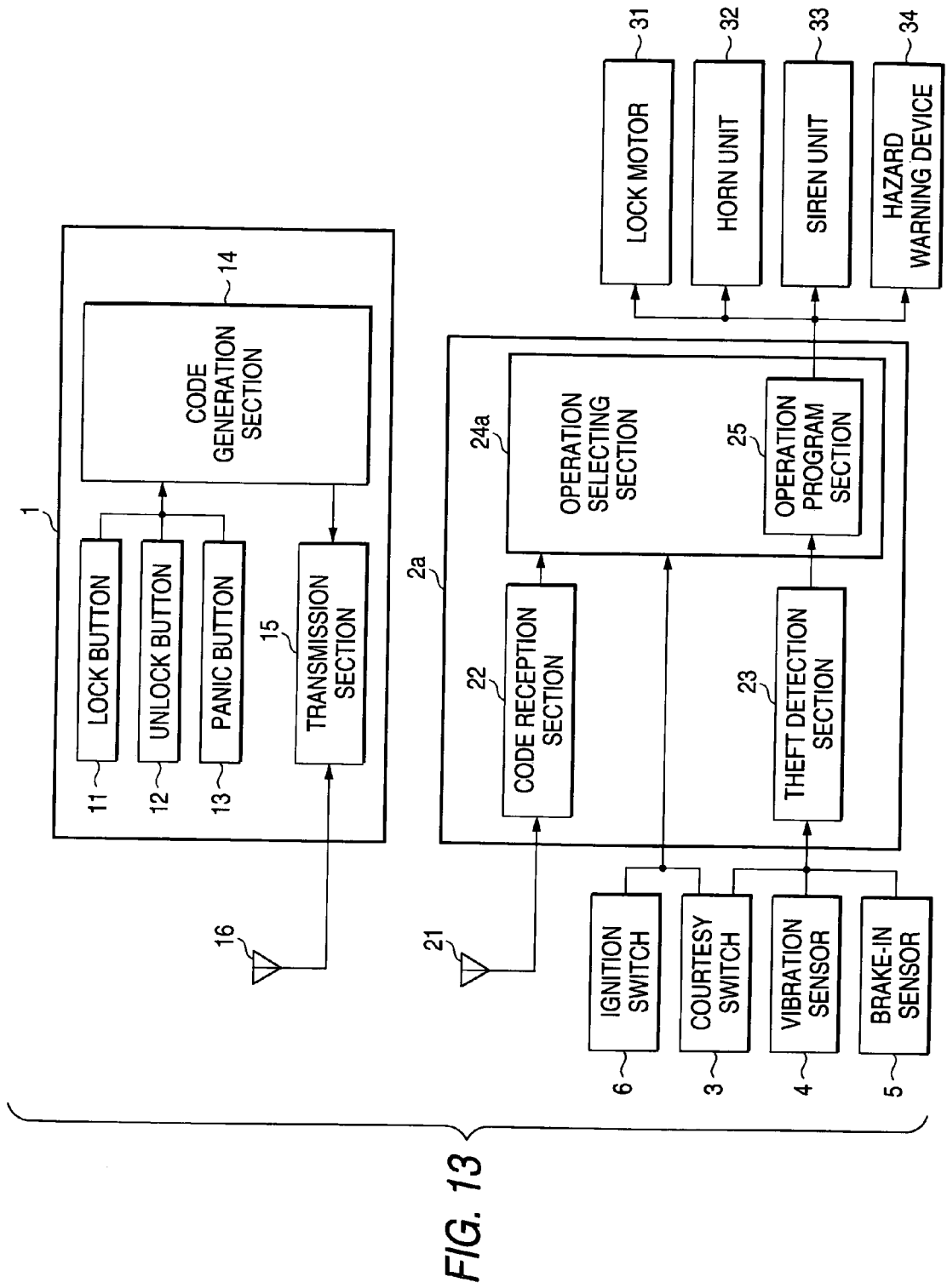
FIG. 13 shows a general configuration of a panic alarm system according to a second embodiment of the invention.

A second embodiment is directed to a panic alarm system in which details of a plurality of alarm operations can be programmed. FIG. 13 shows a general configuration of a panic alarm system according to the second embodiment of the invention.

As shown in FIG. 13, the panic alarm system according to the second embodiment has a receiver 2a as a vehicular alarm apparatus and a transmitter 1 as a remote control apparatus. The receiver 2a is connected to an ignition switch 6. An operation selecting section 24a in the receiver 2a has the same functions as the operation selecting section 24 of the first embodiment does and, in addition, has an operation program section 25 inside. The other parts of the configuration and the operation are the same as in the first embodiment and hence descriptions therefor are omitted by giving components having the same components in the first embodiment the same reference symbols as the latter.

The ignition switch 6 is a switch that is on/off-controlled by the ignition key of the vehicle. The operation selecting section 24a activates the operation program section 25 when the state of the ignition switch 6 and the code reception state of the code reception section 22 have come to satisfy prescribed conditions.

The operation program section 25 changes the detail of each of the various alarm operations on the basis of an input from the courtesy switches 3 or the like.

Figure 14:
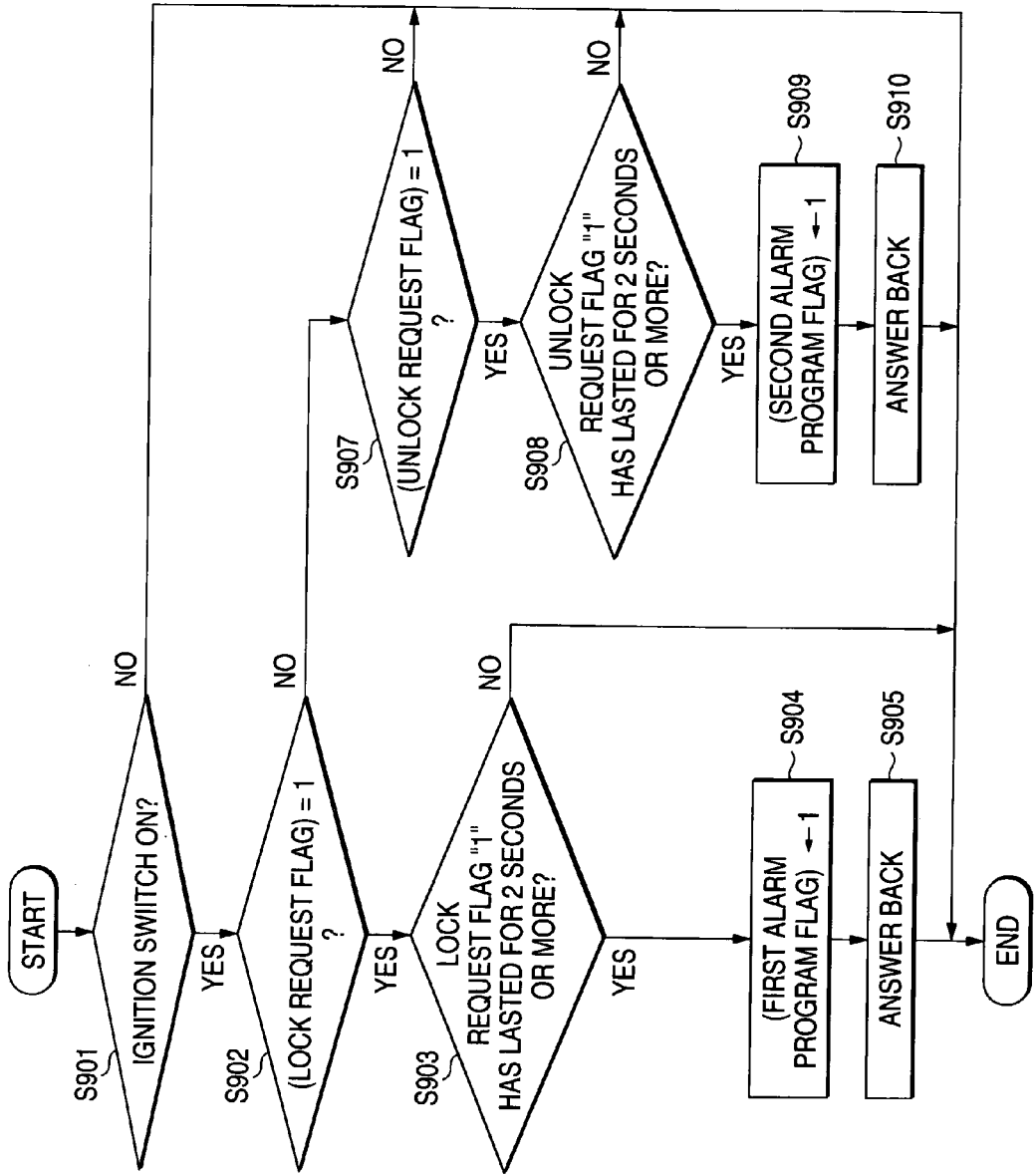
FIG. 14 is a flowchart showing an operation program section activation process that is executed by an operation selecting section shown in FIG. 13.

FIG. 14 is a flowchart showing activation process of the operation program section 25 that is executed by the operation selecting section 24a. This routine is part of a main routine that is executed repeatedly while the receiver 2a is in a power-on state.

As shown in FIG. 14, first, the operation selecting section 24a judges whether or not the ignition switch 6 is in an on-state (step S901). If the ignition switch 6 is in the on-state (step S901: yes), the operation selecting section 24a judges whether or not the value of the lock request flag is equal to "1" (step S902).

If the value of the lock request flag is equal to "1" (step S902: yes), the operation selecting section 24a judges whether or not the state that the value of the lock request flag is equal to "1" has lasted for 2 seconds or more (step S903).

If the state that the value of the lock request flag is equal to "1" has lasted for 2 seconds or more (step S903: yes), the operation selecting section 24a sets the value of a first alarm program flag to "1" (step S904) and answers back to inform the user that first alarm operation will be rewritten (step S905). The first alarm program flag is a flag for instructing the operation program section 25 to rewrite the first alarm operation and takes a value "0" or "1," its initial value being "0."

On the other hand, if the value of the lock request flag is not equal to "1" (step S902: no), the operation selecting section 24a judges whether or not the value of the unlock request flag is equal to "1" (step S907).

If the value of the unlock request flag is equal to "1" (step S907: yes), the operation selecting section 24a judges whether or not the state that the value of the unlock request flag is equal to "1" has lasted for 2 seconds or more (step S908).

If the state that the value of the unlock request flag is equal to "1" has lasted for 2 seconds or more (step S908: yes), the operation selecting section 24a sets the value of a second alarm program flag to "1" (step S909) and answers back to inform the user that second alarm operation will be rewritten (step S910). The second alarm program flag is a flag for instructing the operation program section 25 to rewrite the second alarm operation and takes a value "0" or "1," its initial value being "0."

If the duration of the state that the lock request flag is "1" is shorter than 2 seconds (step S903: no); the duration of the state that the unlock request flag is "1" is shorter than 2 seconds (step S908: no), the value of the unlock flag is not equal to "1" (step S907: no), the ignition switch 6 is in an off-state (step S901: no), or step S905 or S910 has been executed, the operation selecting section 24a exits this routine.

As described above, in this embodiment, the operation selecting section 24a causes the operation program section 25 to rewrite the alarm detail of the first alarm operation if a lock request has lasted for 2 seconds or more with the ignition switch 6 being in the on-state, and causes the operation program section 25 to rewrite the alarm detail of the second alarm operation if an unlock request has lasted for 2 seconds or more with the ignition switch 6 being in the on-state.

Figure 15:
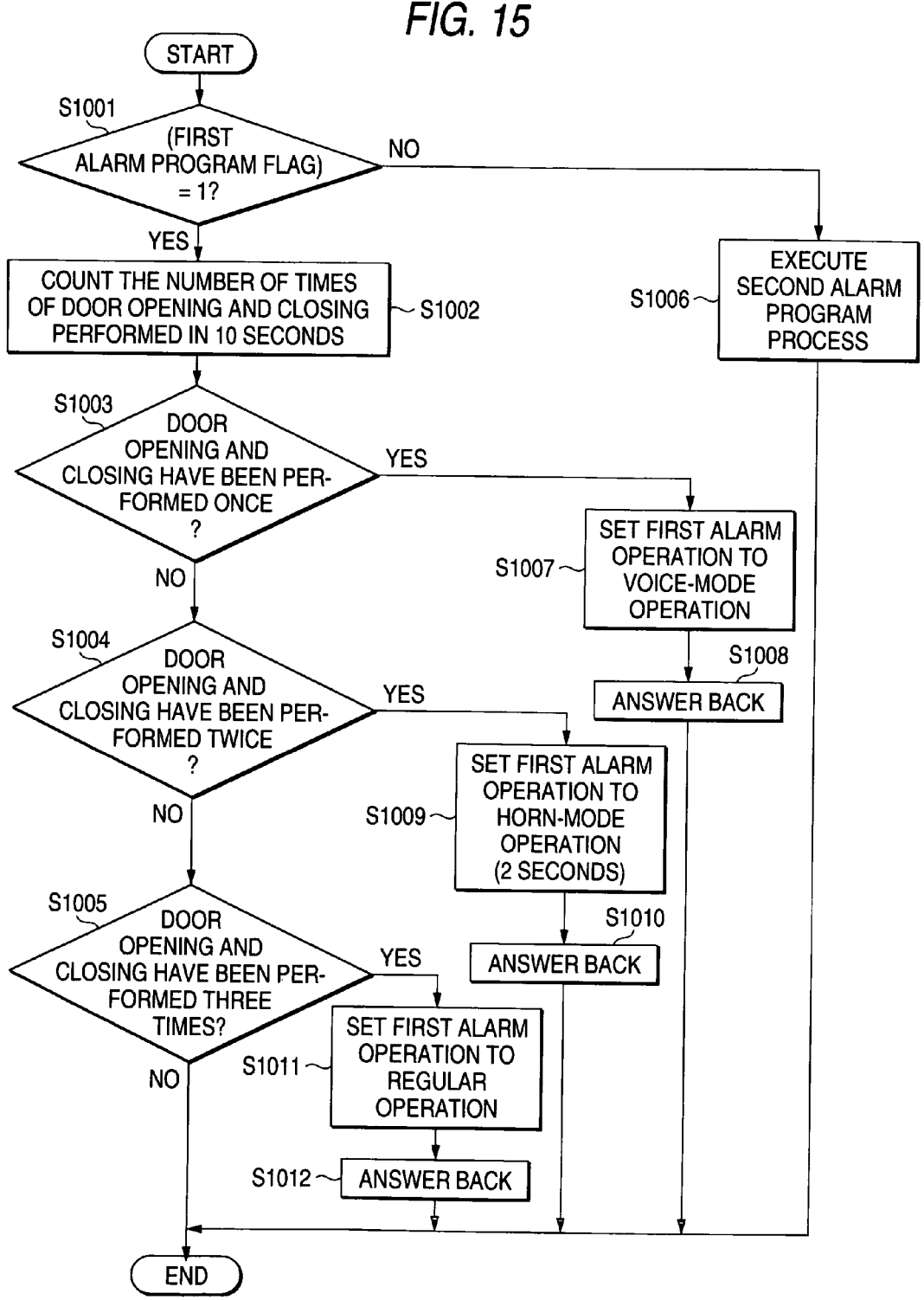
FIG. 15 is a flowchart showing a process that is executed by an operation program section shown in FIG. 13.

Next, a process that is executed by the operation program section 25 will be described. FIG. 15 is a flowchart showing the process that is executed by the operation program section

25. The routine of FIG. 15 is part of the main routine that is executed repeatedly while the receiver 2*a* is in a power-on state.

First, the operation program section 25 judges whether or not the value of the first alarm program flag is equal to "1" (step S1001). If the value of the first alarm program flag is not equal to "1" (step S1001: no), the operation program section 25 executes a second alarm program process (step S1006).

On the other hand, if the value of the first alarm program flag is equal to "1" (step S1001: yes), the operation program section 25 detects the number of times of door opening and closing performed in a prescribed time (e.g., 10 seconds) on the basis of the outputs of the courtesy switches 3 (step S1002). Then, the operation program section 25 judges whether or not door opening and closing have been performed once (step S1003).

If door opening and closing have been performed once (step S1003: yes), the operation program section 25 sets the first alarm operation to a voice-mode alarm operation in which a synthesized voice is output from the siren unit 33 (step S1007). Then, the operation program section 25 answers back to inform the user that the first alarm operation has been set to the voice-mode alarm operation, and clears the first alarm program flag (step S1008)

On the other hand, if door opening and closing have not been performed once (step S1003: no), the operation program section 25 judges whether or not door opening and closing have been performed twice (step S1004). If door opening and closing have been performed twice (step S1004: yes), the operation program section 25 sets the first alarm operation to a 2-second-horn-mode alarm operation in which a warning sound is output for 2 seconds from the horn unit 32 (step S1009). Then, the operation program section 25 answers back to inform the user that the first alarm operation has been set to the 2-second-horn-mode alarm operation, and clears the first alarm program flag (step S1010).

On the other hand, if door opening and closing have not been performed twice (step S1004: no), the operation program section 25 judges whether or not door opening and closing have been performed three times (step S1005). If door opening and closing have been performed three times (step S1005: yes), the operation program section 25 sets the first alarm operation to a regular alarm operation, that is, the alarm operation that is performed at the time of detection of a theft (step S1011). Then, the operation program section 25 answers back to inform the user that the first alarm has been set to the regular alarm operation, and clears the first alarm program flag (step S1012).

For example, the alarm operation (regular alarm operation) that is performed at the time of detection of a theft is such that the horn unit 32 outputs a horn sound for 60 seconds.

If door opening and closing have not been performed three times (step S1005: no) or when step S1006, S1006, S1010, or S1012 has been executed, the operation program section 25 exits this routine.

Figure 16:
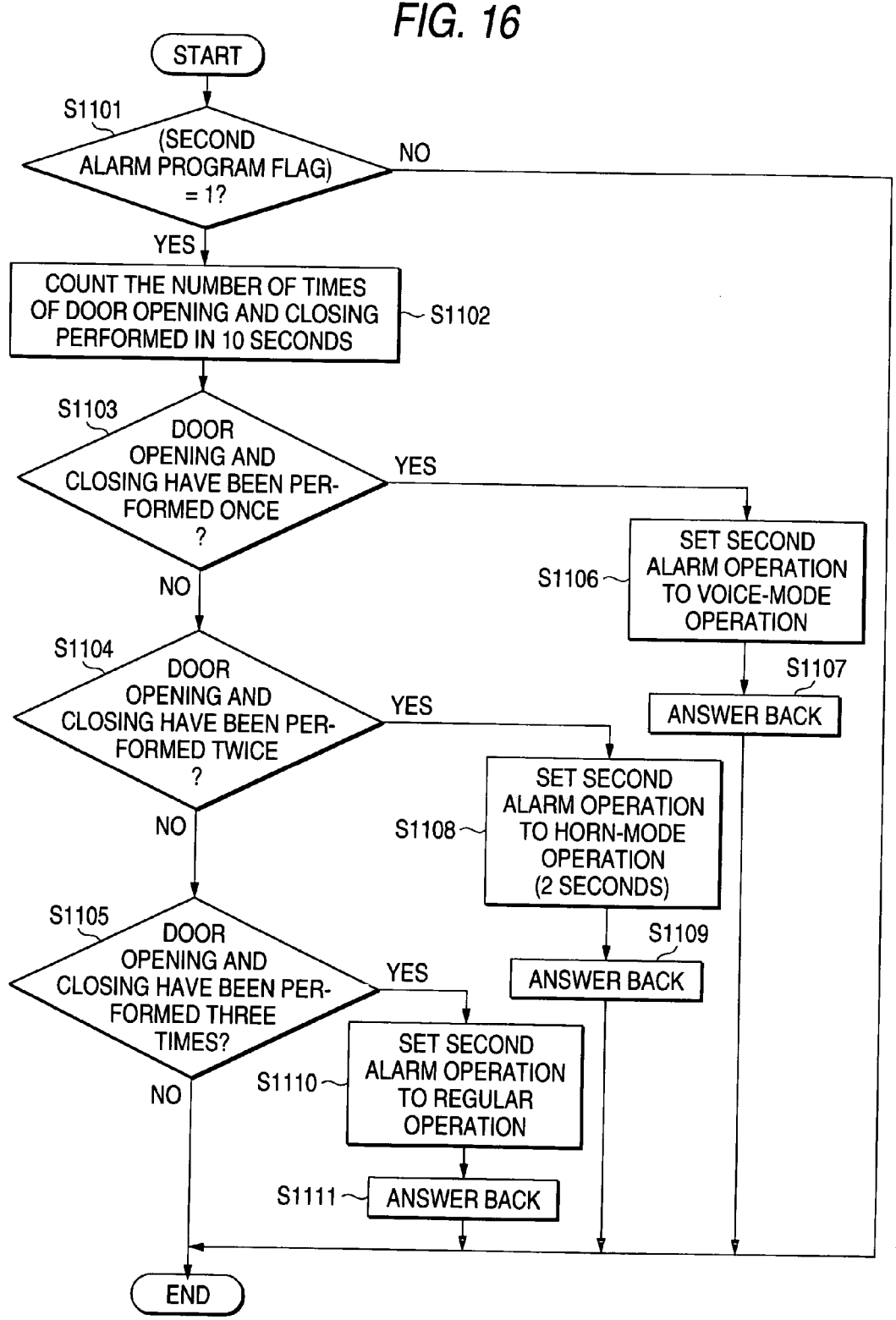
FIG. 16 is a flowchart showing a second alarm program process shown in FIG. 15.

Next, the second alarm program process (step S1006) shown in FIG. 15 will be described. FIG. 16 is a flowchart showing the second alarm program process.

As shown in FIG. 16, first, the operation program section 25 judges whether or not the value of the second alarm program flag is equal to "1" (step S1101). If the value of the second alarm program flag is equal to "1" (step S1101: yes), the operation program section 25 detects the number of times of door opening and closing performed in a prescribed time (e.g., 10 seconds) on the basis of the outputs of the courtesy switches 3 (step S1102). Then, the operation program section 25 judges whether or not door opening and closing have been performed once (step S1103).

If door opening and closing have been performed once (step S1103: yes), the operation program section 25 sets the second alarm operation to a voice-mode alarm operation (step S1106). Then, the operation program section 25 answers back to inform the user that the second alarm operation has been set to the voice-mode alarm operation, and clears the second alarm program flag (step S1107).

On the other hand, if door opening and closing have not been performed once (step S1103: no), the operation program section 25 judges whether or not door opening and closing have been performed twice (step S1104). If door opening and closing have been performed twice (step S1104: yes), the operation program section 25 sets the second alarm operation to a 2-second-horn-mode alarm operation (step S1108). Then, the operation program section 25 answers back to inform the user that the second alarm operation has been set to the 2-second-horn-mode alarm operation, and clears the second alarm program flag (step S1109).

On the other hand, if door opening and closing have not been performed twice (step S1104: no) the operation program section 25 judges whether or not door opening and closing have been performed three times (step S1105). If door opening and closing have been performed three times (step S1105: yes), the operation program section 25 sets the second alarm operation to a regular alarm operation (step S1110). Then, the operation program section 25 answers back to inform the user that the second alarm operation has been set to the regular alarm operation, and clears the second alarm program flag (step S1111).

If door opening and closing have not been performed three times (step S1105: no); if the value of the second alarm program flag is not equal to "1" (step S1101: no); or when step S1107, S1109, or Sllll has been executed, the execution of the second alarm program process is terminated.

As described above, the operation program section 25 can change the alarm details of the first and second alarm operation depending on the number of times of door opening and closing performed successively by using the outputs of the courtesy switches 3. As for the detection of the number of times of door opening and closing, the number may be incremented when opening and closing is performed again within a prescribed time from preceding opening and closing.

Although in the above example the ignition switch 6 is used for activating the alarm operation program process and the courtesy switches 3 are used for identifying an alarm operation, a dedicated manipulation device may be provided or another manipulation device may be used.

Incidentally, the above description is directed to the panic alarm system capable of selecting an arbitrary one from among the plural panic alarm operations. However, for example, only a single kind of panic alarm operation may be provided that is less loud than the alarm operation that is performed at the time of detection of a theft.

Figure 17:
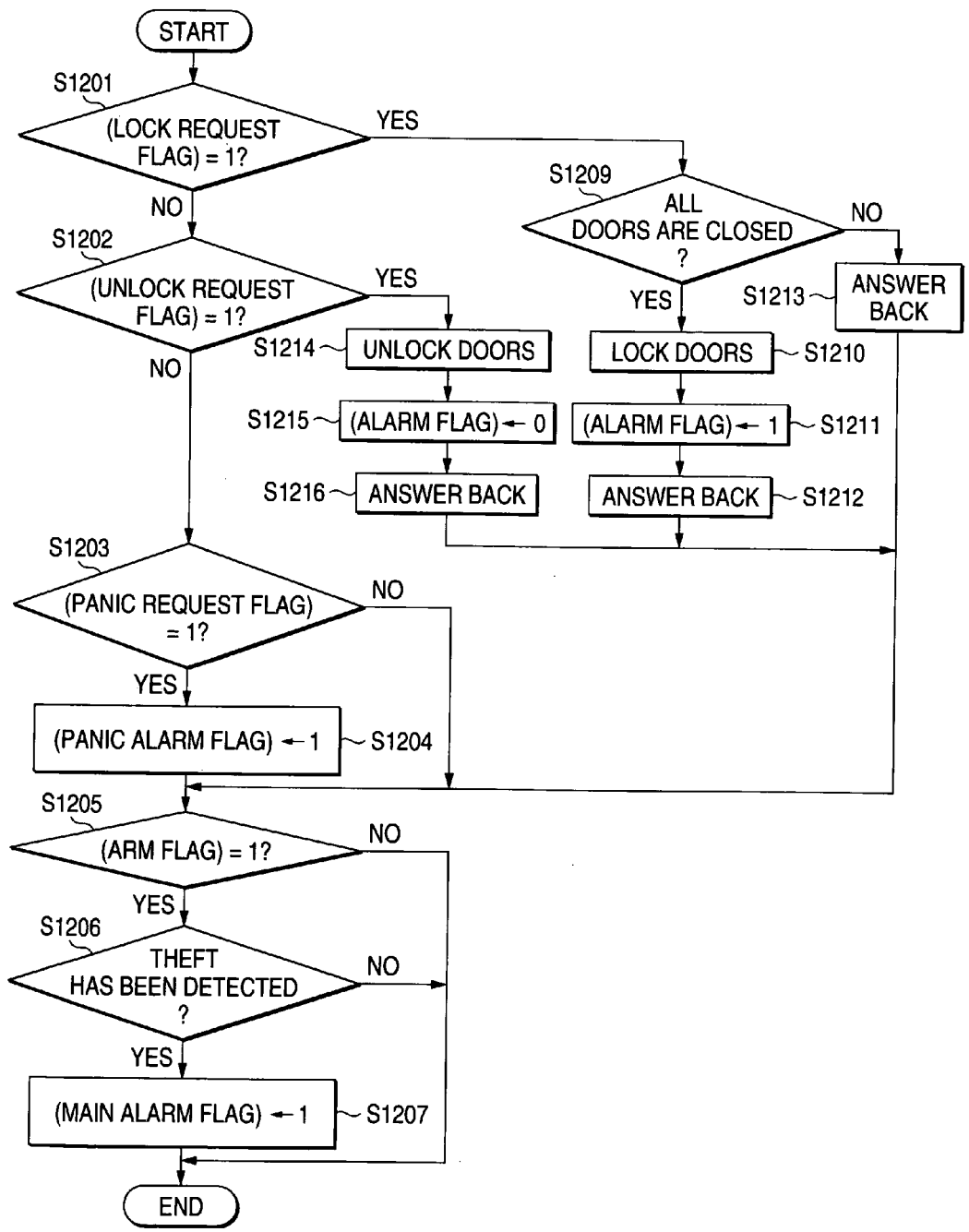
FIG. 17 is a flowchart showing a process that is executed by the operation selecting section in the case where only a single kind of panic alarm operation is provided that is less loud than an alarm operation that is performed at the time of detection of a theft.

FIG. 17 is a flowchart showing a process that is executed by the operation selecting section 24*a* in the case where only a single kind of panic alarm operation is provided that is less loud than the alarm operation that is performed at the time of detection of a theft. Like the routines of FIGS. 6, 10, and 12, the routine of FIG. 17 is part of the main routine that is executed repeatedly while the receiver 2*a* is in a power-on state.

As shown in FIG. 17, first, the operation selecting section 24*a* judges whether or not the value of the lock request flag is equal to "1" (step S1201). If the value of the lock request flag is equal to "1" (step S1201: yes), the operation selecting section 24a judges on the basis of the outputs of the courtesy switches 3 whether or not all the doors of the vehicle are closed (step S1209).

If all the doors are closed (step S1209: yes), the operation selecting section 24a locks the doors by causing the lock motor 31 to operate (step S1210) and sets the value of an arm flag to "1" (step S1211).

When step S1211 has been executed, the operation selecting section 24a sets the value of the lock request flag to "0" and answers back to inform the user of the completion of locking by using the hazard warning device 34, the horn unit 32, or the like (step S1212).

If there is an unclosed door (step S1209: no), the operation selecting section 24a answers back to inform the user of the situation that the doors cannot be locked because of the presence of an unclosed door (step S1213).

On the other hand, if the value of the lock request flag is not equal to "1" (step S1201: no), the operation selecting section 24a judges whether or not the value of the unlock request flag is equal to "1" (step S1202).

If the value of the unlock request flag is equal to "1" (step S1202: yes), the operation selecting section 24a unlocks the doors by causing the lock motor 31 to operate (step S1214), sets the value of the arm flag to "0" (step S1215), and then answers back to inform the user of the completion of unlocking by using the hazard warning device 34, the horn unit 32, or the like (step S1216).

On the other hand, if the value of the unlock request flag is not equal to "1" (step S1202: no), the operation selecting section 24a judges whether or not the value of a panic request flag is equal to "1" (step S1203).

If the value of the panic request flag is equal to "1" (step S1203: yes), the operation selecting section 24a sets the value of a panic alarm flag to "1" (step S1205). The panic alarm flag takes a value "0" or "1," its initial value being "0."

If the value of the panic request flag is not equal to "1" (step S1203: no) or when step S1204, S1212, S1213, or S1216, has been executed, the operation selecting section 24a judges whether or not the value of the arm flag is equal to "1" (step S1205)

If the value of the arm flag is equal to "1" (step S1205: yes), the operation selecting section 24a judges whether or not the theft detection section 23 has detected a theft (step S1206).

If the theft detection section 23 has detected a theft (step S1206: yes), the operation selecting section 24a sets the value of a main alarm flag to "1" (step S1207).

The operation selecting section 24a exits this routine if the value of the arm flag is not equal to "1" (step S1205: no); if the theft detection section 23 has not detected a theft (step S1206: no); or when step S1207 has been executed.

Next, an alarm operation that is performed by the operation selecting section 24a in the case where only the single kind of panic alarm operation is provided that is less loud than the alarm operation that is performed at the time of detection of a theft will be described with reference to a flowchart of FIG. 18. Like the routines of FIGS. 7 and 11, the routine of FIG. 18 is part of the main routine that is executed repeatedly while the receiver 2a is in a power-on state.

Figure 18:
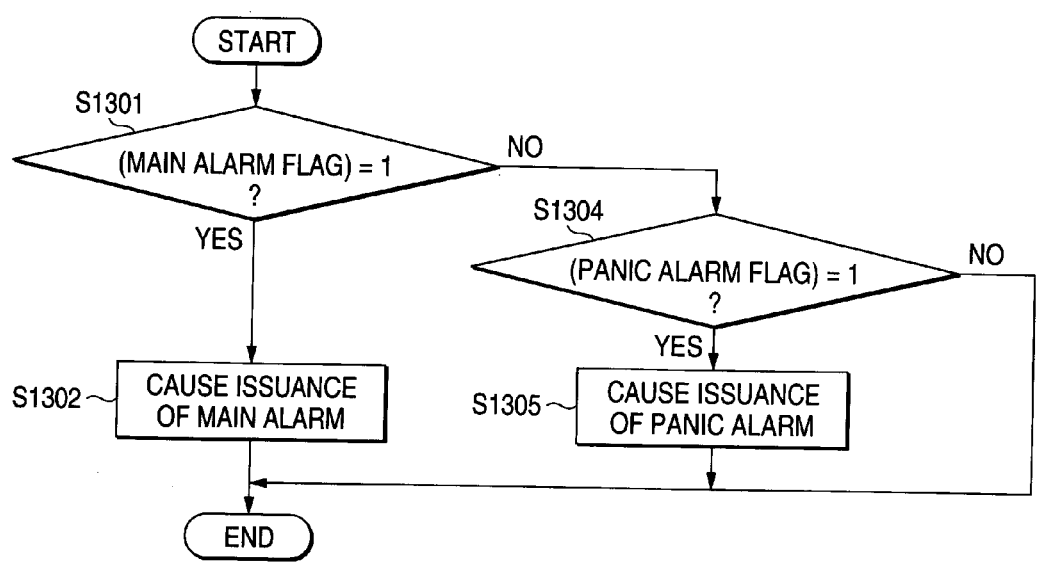
FIG. 18 is a flowchart showing an alarm operation that is performed by the operation selecting section in the case where only the single kind of panic alarm operation is provided that is less loud than the alarm operation that is performed at the time of detection of a theft.

As shown in FIG. 18, first, the operation selecting section 24a judges whether or not the value of the main alarm flag is equal to "1" (step S1301). If the value of the main alarm flag is equal to "1" (step S1301: yes), the operation selecting section 24a causes output of a main alarm (e.g., causes the horn unit 32 to output a warning sound for 60 seconds) and sets the value of the main alarm flag to "0" (step S1302).

On the other hand, if the value of the main alarm flag is not equal to "1" (step S1301: no), the operation selecting section 24a judges whether or not the value of the panic alarm flag is equal to "1" (step S1304).

If the value of the panic alarm flag is equal to "1" (step S1304: yes), the operation selecting section 24a causes output of a panic alarm (e.g., causes the siren unit 33 to output a warning voice or causes the horn unit 32 to output a warning sound for 2 seconds) and sets the value of the panic alarm flag to "0" (step S1305).

The operation selecting section 24a exits this routine if the value of the panic alarm flag is not equal to "1" (step S1304: no) or when step S1302 or S1305 has been executed.

Even in the case where only the single kind of panic alarm operation is provided that is less loud than the alarm operation that is performed at the time of detection of a theft, the details of the panic alarm operation and the alarm operation that is performed at the time of detection of a theft may be made programmable.

Figure 19:
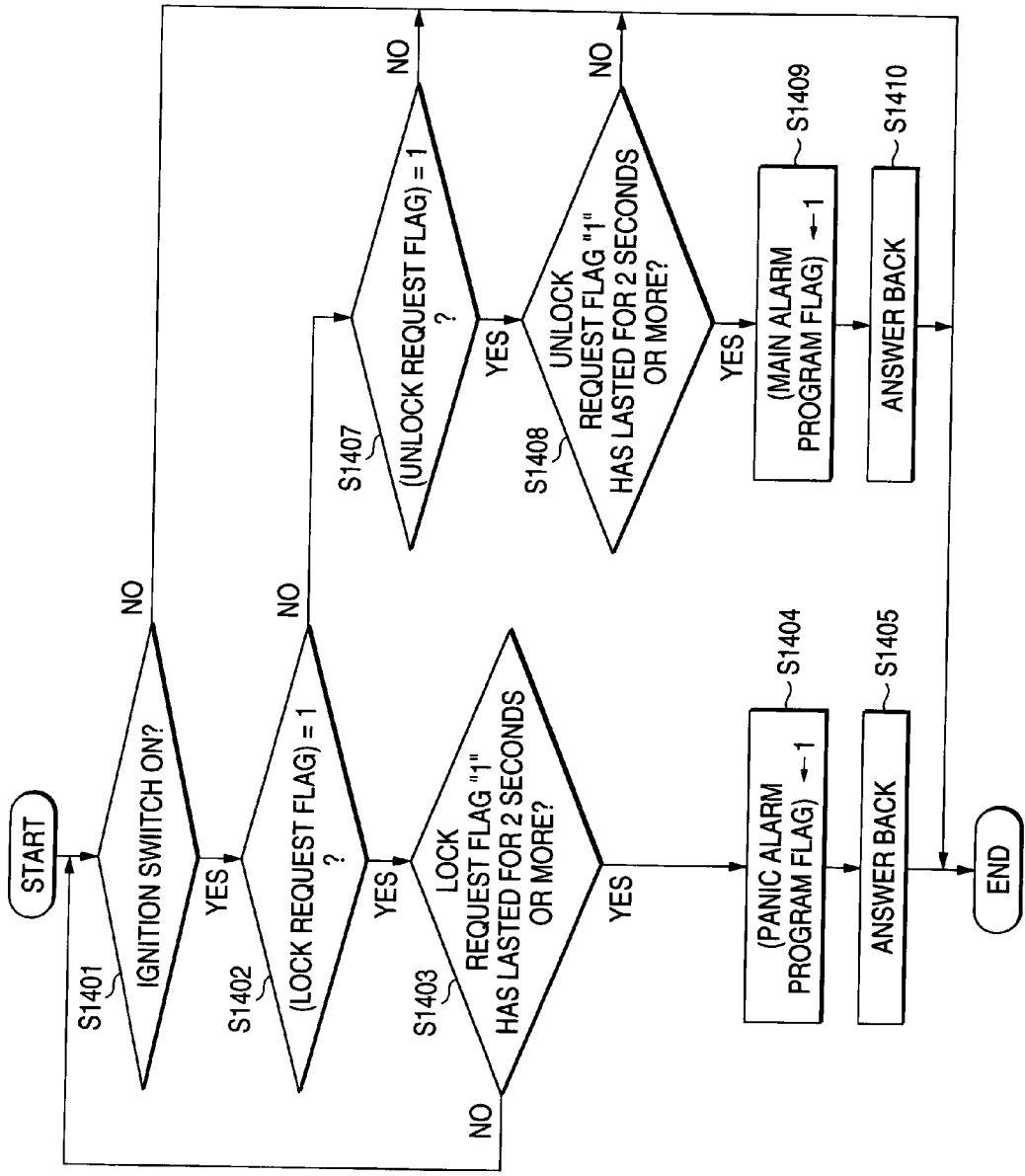
FIG. 19 is a flowchart showing an operation program section activation process that is executed in the case where only the single kind of panic alarm operation is provided that is less loud than the alarm operation that is performed at the time of detection of a theft.

FIG. 19 is a flowchart of activation process of the operation program section 25 that is executed in the case where only the single kind of panic alarm operation is provided that is less loud than the alarm operation that is performed at the time of detection of a theft. According to this flowchart, the value of a panic alarm program flag is set to "1" if a state that the value of the lock request flag is equal to "1" has lasted for 2 seconds or more (step S1403: yes) with the ignition switch being turned on.

Further, the value of a main alarm program flag is set to "1" if a state that the value of the unlock request flag is equal to "1" has lasted for 2 seconds or more (step S1408: yes) with the ignition switch 6 being turned on. The other part of the process is the same as the corresponding part of the process of FIG. 14, and hence will not be described.

Figure 20:
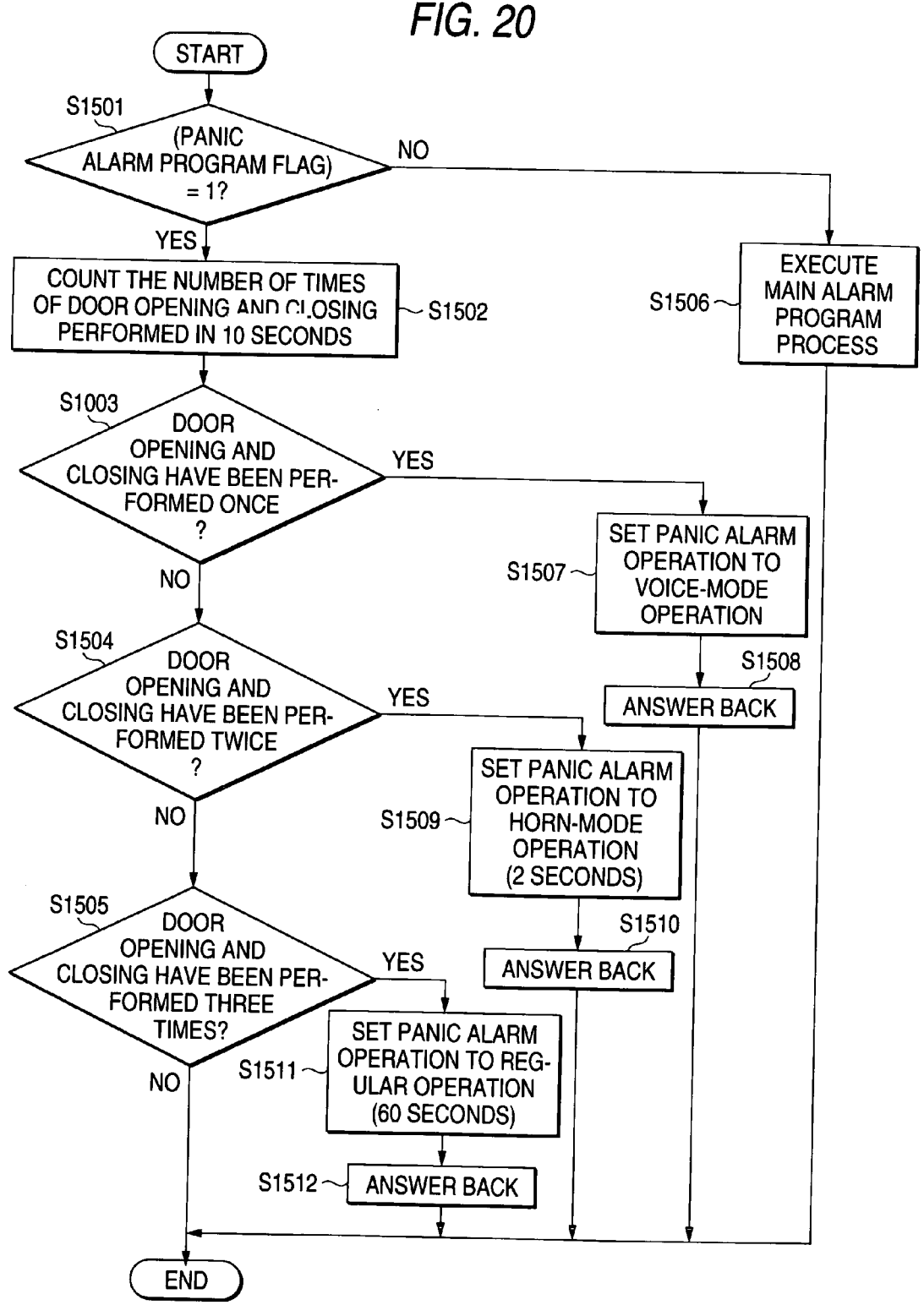
FIG. 20 is a flowchart showing a process that is executed by the operation program section in the case where only the single kind of panic alarm operation is provided that is less loud than the alarm operation that is performed at the time of detection of a theft.

FIG. 20 is a flowchart showing a process that is executed by the operation program section 25 in the case where only the single kind of panic alarm operation is provided that is less loud than the alarm operation that is performed at the time of detection of a theft. Like the routine of FIG. 15, the routine of FIG. 20 is part of the main routine that is executed repeatedly while the receiver 2a is in a power-on state.

First, the operation program section 25 judges whether or not the value of the panic alarm program flag is equal to "1" (step S1501). If the value of the panic alarm program flag is not equal to "1" (step S1501: no), the operation program section 25 executes a main alarm program process (step S1506).

On the other hand, if the value of the panic alarm program flag is equal to "1" (step S1501: yes), the operation program section 25 detects the number of times of door opening and closing performed in a prescribed time (e.g., 10 seconds) on the basis of the outputs of the courtesy switches 3 (step S1502). Then, the operation program section 25 judges whether or not door opening and closing have been performed once (step S1503).

If door opening and closing have been performed once (step S1503: yes), the operation program section 25 sets the panic alarm operation to a voice-mode alarm operation (step S1507). Then, the operation program section 25 answers back to inform the user that the panic alarm operation has been set to the voice-mode alarm operation, and clears the panic alarm program flag (step S1508).

On the other hand, if door opening and closing have not been performed once (step S1503: no), the operation program section 25 judges whether or not door opening and closing have been performed twice (step S1504). If door opening and closing have been performed twice (step S1504: yes), the operation program section 25 sets the panic alarm operation to a 2-second-horn-mode alarm operation (step S1509). Then, the operation program section 25 answers back to inform the user that the panic alarm operation has been set to the 2-second-horn-mode alarm operation, and clears the panic alarm program flag (step S1510).

On the other hand, if door opening and closing have not been performed twice (step S1504: no), the operation program section 25 judges whether or not door opening and closing have been performed three times (step S1505). If door opening and closing have been performed three times (step S1505: yes), the operation program section 25 sets the panic alarm operation to a 60-second-horn-mode alarm operation (step S1511). Then, the operation program section 25 answers back to inform the user that the panic alarm has been set to the 60-second-horn-mode alarm operation, and clears the panic alarm program flag (step S1512).

If door opening and closing have not been performed three times (step S1505: no) or when step S1506, S1508, S1510, or S1512 has been executed, the operation program section 25 exits this routine.

Figure 21:
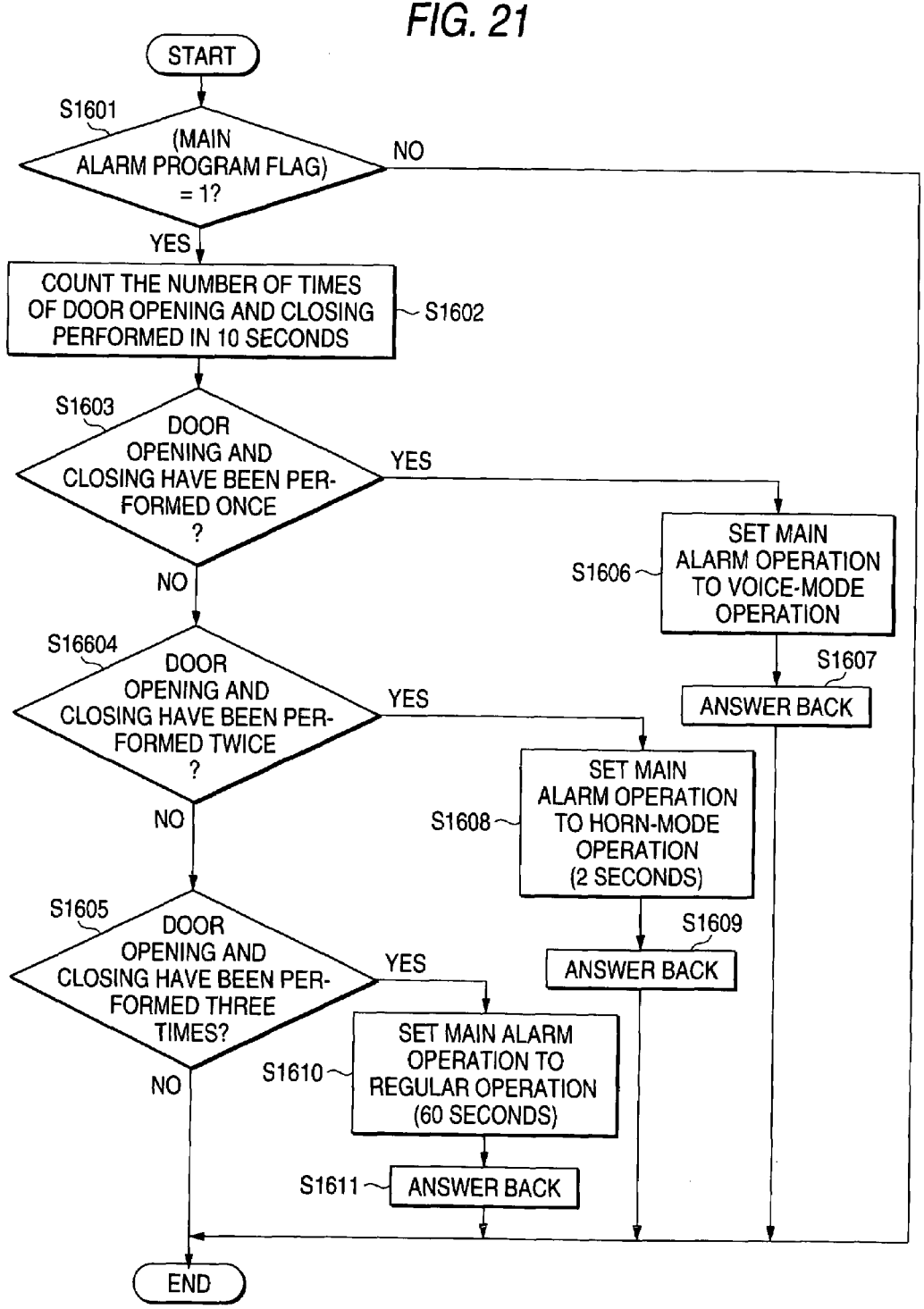
FIG. 21 is a flowchart showing a main alarm program process shown in FIG. 20.

Next, the main alarm program process shown in FIG. 20 will be described. FIG. 21 is a flowchart showing the second alarm program process.

As shown in FIG. 21, first, the operation program section 25 judges whether or not the value of the main alarm program flag is equal to "1" (step S1601). If the value of the main alarm program flag is equal to "1" (step S1601: yes), the operation program section 25 detects the number of times of door opening and closing performed in a prescribed time (e.g., 10 seconds) on the basis of the outputs of the courtesy switches 3 (step S1602) Then, the operation program section 25 judges whether or not door opening and closing have been performed once (step S1603).

If door opening and closing have been performed once (step S1603: yes), the operation program section 25 sets the main alarm operation to a voice-mode alarm operation (step S1606). Then, the operation program section 25 answers back to inform the user that the main alarm operation has been set to the voice-mode alarm operation, and clears the main alarm program flag (step S1607).

On the other hand, if door opening and closing have not been performed once (step S1603: no), the operation program section 25 judges whether or not door opening and closing have been performed twice (step S1604). If door opening and closing have been performed twice (step S1604: yes), the operation program section 25 sets the main alarm operation to a 2-second-horn-mode alarm operation (step S1608). Then, the operation program section 25 answers back to inform the user that the main alarm operation has been set to the 2-second-horn-mode alarm operation, and clears the main alarm program flag (step S1609).

On the other hand, if door opening and closing have not been performed twice (step S1604: no), the operation program section 25 judges whether or not door opening and closing have been performed three times (step S1605). If door opening and closing have been performed three times (step S1605: yes), the operation program section 25 sets the main alarm operation to a 60-second-horn-mode alarm operation (step S1610). Then, the operation program section 25 answers back to inform the user that the main alarm operation has been set to the 60-second-horn-mode alarm operation, and clears the main alarm program flag (step S1611).

If door opening and closing have not been performed three times (step S1605: no); if the value of the main alarm program flag is not equal to "1" (step S1601: no); or when step S1607, S1609, or S1611 has been executed, the execution of the main alarm program process is terminated.

As described above, even in the case where only the single kind of panic alarm operation is provided that is less loud than the alarm operation that is performed at the time of detection of a theft, the details of the panic alarm operation and the alarm operation that is performed at the time of detection of a theft can be programmed.

As described above, in the panic alarm system according to the second embodiment, an arbitrary one can be selected from the plural alarm operations and its detail can be programmed. Therefore, an effective alarm operation that is low in the degree of noise pollution and can repel a suspicious person can be selected arbitrarily.

The above-described first and second embodiments employ, as exemplary alarm operations, output of a warning sound from the form unit 32 and output of a warning voice from the siren unit 33. However,in implementing the invention,arbitrary alarm operations can be employed.

For example, a speaker for alarming may be provided or an alarm operation may be performed by using lamps such as head lamps. Further, a variety of forms of alarming may be performed such as varying the output duration or volume of an alarm or varying the output sound itself.

In particular, it is desirable that the voice output from the siren unit be such that the content of the voice has a suspicious person repelling effect like "We will inform the police," or "We will start photographing the surroundings"

A technique has been known in which when a theft is detected in an automatic manner, a low-level alarm operation (pre-alarming) is performed before a prime alarm operation. For example, when a suspicious person's breaking into the vehicle is detected in the automatic manner, a horn sound is output for 2 seconds as pre-alarming and then a horn sound is output continuously if the suspicious person continues his or her activity.

In this case, if the detail of the panic alarm operation is made the same as that of the pre-alarming, the panic alarm operation can be used as pre-alarming, that is, an alarm of the panic alarm operation can be issued automatically by the vehicle itself.

This makes it possible to repel a suspicious person without causing him or her to recognize the approach of the user to the vehicle, which can increase the safety of the user.

Although the above-described first and second embodiments employ one or two kinds of panic alarm operations, the invention may be implemented by a configuration that allows selection from three or more kinds of panic alarm operations.

As described above, the panic alarm system consisting of the vehicular alarm apparatus and its remote control apparatus according to the invention is useful in issuing an alarm at the time of occurrence of an abnormality in a vehicle and, in particular, is suitable for attaining both of the suspicious person repelling effect and the noise pollution reducing effect.

What is claimed is:

1. A remote control apparatus for controlling operation of a vehicular alarm apparatus, the remote control apparatus comprising:
   a transmission section operable to selectably transmit to the vehicular alarm apparatus, one of:
   (a) a first alarm instruction for causing the vehicular alarm apparatus to perform a first alarm operation; and
   (b) a second alarm instruction for causing the vehicular alarm apparatus to perform a second alarm operation which is different from the first alarm operation, wherein the vehicular alarm apparatus outputs sound as the first alarm operation when receiving the first alarm instruction; and wherein the vehicular alarm apparatus outputs sound as the second alarm operation in a different manner from the first alarm operation when receiving the second alarm instruction.

2. The remote control apparatus according to claim 1, further comprising:

a common manipulation section that is used both in transmitting the first alarm instruction and in transmitting the second alarm instruction, wherein:

the transmission section determines which of the first alarm instruction and the second alarm instruction should be transmitted depending on how the common manipulation section is manipulated.

3. The remote control apparatus according to claim 2, wherein the common manipulation section is used in making a manipulation for transmitting at least one of a vehicle door lock instruction, a vehicle door unlock instruction, a monitoring start instruction, and a monitoring end instruction.

4. The remote control apparatus according to claim 1, wherein:

the transmission section stores a first output condition corresponding to the first alarm instruction and a second output condition corresponding to the second alarm instruction;

the transmission section transmits the first alarm instruction at a time point when the first output condition is satisfied; and the transmission section switches the first alarm instruction to the second alarm instruction when the second output condition is satisfied after the satisfaction of the first output condition.

5. The remote control apparatus according to claim 1, wherein the first alarm operation is less loud than the second alarm operation.

6. A vehicular alarm apparatus comprising:

a reception section operable to receive one of a first alarm instruction and a second alarm instruction which are adapted to be selectably transmitted by a transmitter; and an alarm section that selects a first alarm operation when the reception section receives the first alarm instruction and selects a second alarm operation which is different from the first alarm operation when the reception section receives the second alarm instruction, wherein the alarm section outputs sound as the first alarm operation when the reception section receives the first alarm instruction; and wherein the alarm section outputs sound as the second alarm operation in a different manner from the first alarm operation when the reception section receives the second alarm instruction.

7. The vehicular alarm apparatus according to claim 6, wherein the first alarm operation is less loud than the second alarm operation.

8. The vehicular alarm apparatus according to claim 6, further comprising:

a program section that changes an operation detail of at least one of the first alarm operation and the second alarm operation.

9. A vehicular alarm apparatus comprising:

a theft detection section operable to detect a theft in response to an output from a sensor mounted on a vehicle;

a reception section operable to receive an instruction which is adapted to be transmitted by a transmitter; and an operation selecting section operable to select one of a first alarm operation and a second alarm operation which is different from the first alarm operation, wherein:

the operation selecting section selects and performs the first alarm operation when the reception section receives the alarm instruction; and the operation selecting section selects and performs the second alarm operation when the theft detection section detects the theft.

10. The vehicular alarm apparatus according to claim 9, wherein the first alarm operation is less loud than the second alarm operation.

11. The vehicular alarm apparatus according to claim 9, wherein:

the operation selecting section outputs sound as the first alarm operation; and the operation selecting section outputs as the second alarm operation, sound being louder than that of the first alarm operation.

12. The vehicular alarm apparatus according to claim 9, wherein:

the operation selecting section emits light as the first alarm operation; and the operation selecting section outputs sound as the second alarm operation.

13. The remote control apparatus according to claim 1, wherein the sound output as the first alarm operation is different from the sound output as the second alarm operation.

14. The vehicular alarm apparatus according to claim 6, wherein the sound output as the first alarm operation is different from the sound output as the second alarm operation.

* * * * *